(12) United States Patent
Saito et al.

(10) Patent No.: US 12,369,510 B2
(45) Date of Patent: Jul. 29, 2025

(54) AUTONOMOUS STEERING METHOD, AUTONOMOUS STEERING SYSTEM, AND AUTONOMOUS STEERING PROGRAM

(71) Applicant: Yanmar Holdings Co., Ltd., Osaka (JP)

(72) Inventors: Masafumi Saito, Okayama (JP); Seungkyu Lee, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 101 days.

(21) Appl. No.: 18/412,968

(22) Filed: Jan. 15, 2024

(65) Prior Publication Data

US 2024/0276901 A1 Aug. 22, 2024

(30) Foreign Application Priority Data

Feb. 16, 2023 (JP) .................. 2023-022285

(51) Int. Cl.
*A01B 69/00* (2006.01)
*A01B 69/04* (2006.01)

(52) U.S. Cl.
CPC ................. *A01B 69/008* (2013.01)

(58) Field of Classification Search
None
See application file for complete search history.

(56) References Cited

U.S. PATENT DOCUMENTS

| | | | |
|---|---|---|---|
| 8,140,266 B2* | 3/2012 | Nakamura | G01C 21/32 701/495 |
| 10,191,492 B2* | 1/2019 | Ogura | A01B 69/008 |
| 11,442,468 B2* | 9/2022 | Ogura | G05D 1/6445 |
| 2010/0082238 A1* | 4/2010 | Nakamura | G01C 21/32 701/532 |
| 2010/0292883 A1* | 11/2010 | Nishijima | G05D 1/0274 701/25 |
| 2017/0177002 A1* | 6/2017 | Ogura | G05D 1/0278 |
| 2019/0227561 A1* | 7/2019 | Hiramatsu | G05D 1/6484 |
| 2020/0348690 A1* | 11/2020 | Ogura | G05D 1/6445 |
| 2025/0121853 A1* | 4/2025 | Hori | B60W 10/20 |

FOREIGN PATENT DOCUMENTS

| | | | | |
|---|---|---|---|---|
| JP | H11264155 A | * | 9/1999 | |
| JP | 2007003298 A | * | 1/2007 | |
| JP | 2008250879 A | * | 10/2008 | |
| JP | 2017116414 A | * | 6/2017 | |
| JP | 2019175137 A | * | 10/2019 | |
| JP | 7202982 B2 | * | 1/2023 | |
| JP | 2023053536 A | * | 4/2023 | |
| KR | 20210156298 A | * | 12/2021 | ........... G05D 1/2246 |
| WO | WO-2006128758 A1 | * | 12/2006 | .............. B60T 8/172 |
| WO | WO-2007132859 A1 | * | 11/2007 | ......... G08G 1/09675 |

* cited by examiner

*Primary Examiner* — Shelley Chen
(74) *Attorney, Agent, or Firm* — Chris Mizumoto

(57) ABSTRACT

A positioning control unit performs positioning of a position of a work machine. A vehicle control device causes the work machine to execute autonomous steering on the basis of position information indicating the position of the work machine, for which the positioning is performed. A restriction processing unit permits predetermined processing related to the autonomous steering when positional accuracy of the positioning is within an allowable range. A setting processing unit sets the allowable range on the basis of a user operation or work information in the work machine.

11 Claims, 13 Drawing Sheets

AUTONOMOUS STEERING METHOD, AUTONOMOUS STEERING SYSTEM, AND AUTONOMOUS STEERING PROGRAM

CROSS-REFERENCE

This application claims foreign priority of JP2023-022285 filed Feb. 16, 2023, the disclosure of which is hereby incorporated by reference in its entirety.

TECHNICAL FIELD

The present invention relates to an autonomous steering method, an autonomous steering system, and an autonomous steering program for causing a work machine to perform autonomous steering.

BACKGROUND ART

When an autonomously traveling work vehicle cannot receive radio waves from satellites or radio wave interference occurs, positional accuracy of positioning decreases, thereby causing a problem of decreasing accuracy of autonomous traveling. Conventionally, a technique is known in which a reference route can be set on condition that the positional accuracy of positioning of a work vehicle is equal to or more than accuracy (threshold value) set in advance (for example, refer to Patent Document 1).

PRIOR ART DOCUMENT

Patent Document

Patent Document 1: Japanese Patent No. 7120907

SUMMARY OF INVENTION

Technical Problem

However, in the conventional technology, since the threshold value that is a determination condition of the positional accuracy is uniformly set, a decrease in work efficiency may be caused. For example, in a case where the required positional accuracy is different depending on the type of work, the threshold value has higher accuracy than necessary or has insufficiently low accuracy, and thus a situation in which the reference route cannot be appropriately set or autonomous traveling cannot be started occurs, thereby causing a problem of decreasing the work efficiency.

It is an object of the present invention to provide an autonomous steering method, an autonomous steering system, and an autonomous steering program capable of improving the work efficiency of a work machine that can perform autonomous steering.

Solution to Problem

An autonomous steering method according to the present invention is a method executing: performing positioning of a position of a work machine; causing the work machine to execute autonomous steering on the basis of position information indicating the position of the work machine, for which the positioning is performed; permitting predetermined processing related to the autonomous steering when positional accuracy of the positioning is within an allowable range; and setting the allowable range on the basis of a user operation or work information in the work machine.

An autonomous steering system according to the present invention includes: a positioning processing unit that performs positioning of a position of a work machine; a steering processing unit that causes the work machine to execute autonomous steering on the basis of position information indicating the position of the work machine, for which the positioning is performed; a restriction processing unit that permits predetermined processing related to the autonomous steering when positional accuracy of the positioning is within an allowable range; and a setting processing unit that sets the allowable range on the basis of a user operation or work information in the work machine.

An autonomous steering program according to the present invention is a program for causing one or more processors to execute: performing positioning of a position of a work machine; causing the work machine to execute autonomous steering on the basis of position information indicating the position of the work machine, for which the positioning is performed; permitting predetermined processing related to the autonomous steering when positional accuracy of the positioning is within an allowable range; and setting the allowable range on the basis of a user operation or work information in the work machine.

Advantageous Effects of Invention

According to the present invention, an autonomous steering method, an autonomous steering system, and an autonomous steering program capable of improving the work efficiency of a work machine that can perform autonomous steering can be provided.

DESCRIPTION OF EMBODIMENTS

The following embodiments are examples embodying the present invention, and are not intended to limit the technical scope of the present invention.

An autonomous traveling system according to an embodiment of the present invention (an example of an autonomous steering system of the present invention) includes a work machine 10, a satellite (not illustrated), and a base station (not illustrated). In the present embodiment, a case where the work machine 10 is a tractor is taken as an example for the explanation. As another embodiment, the work machine 10 may be a work vehicle such as a rice transplanter, a combine harvester, a construction machine, or a snowplow, or a flying object such as a drone for spraying work. In response to an operation by a worker (user), the work machine 10 performs predetermined work (for example, tilling work) while traveling in accordance with a target route in a field F (refer to FIG. 4). Specifically, the work machine 10 travels straight ahead on the target route in response to autonomous traveling and travels while turning in response to manual steering (driving operation) by the worker. The work machine 10 travels in the field F and performs work while switching between autonomous traveling on a straight route and manual traveling on a turning route. The target route may be generated in advance on the basis of the operation by the worker and stored as route data.

The work machine 10 may autonomously travel on each of the straight route and the turning route in accordance with the target route.

The satellite is a positioning satellite that configures a satellite positioning system such as a global navigation satellite system (GNSS), and transmits a GNSS signal (satellite signal). The base station is a reference point (reference station) that configures the satellite positioning system. The base station transmits, to the work machine 10, correction information for calculating the current position of the work machine 10.

Figure 4:
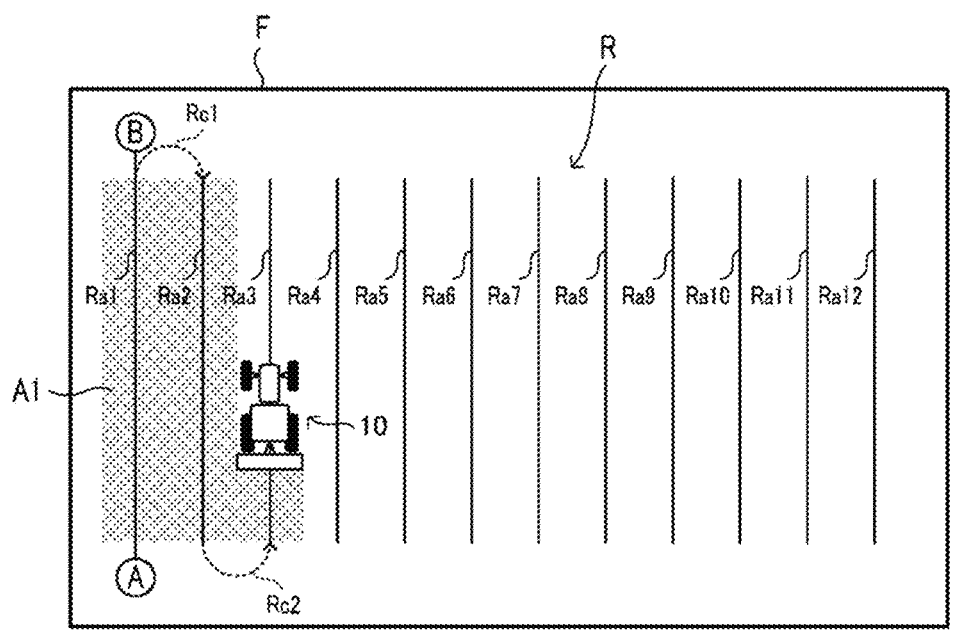
FIG. 4 is a diagram illustrating an example of a target route of the work machine according to the embodiment of the present invention.

The work machine 10 travels in the field F illustrated in FIG. 4, for example, while repeating straight traveling and turning traveling until the work is finished. A target route R for autonomous traveling includes a plurality of straight routes (work routes). The plurality of work routes are substantially parallel to one another. FIG. 4 illustrates work routes Ra1 to Ra12. For example, the work machine 10 sequentially executes autonomous traveling on the work route Ra1, manual traveling on a turning route Rc1, autonomous traveling on the work route Ra2, manual traveling on a turning route Rc2, and autonomous traveling on the work route Ra3. A reference sign A1 illustrated in FIG. 4 indicates a work trajectory (worked area) in which the work machine 10 has traveled and performed work.

The target route R illustrated in FIG. 4 is an example, and the target route R is appropriately determined in accordance with a size of the work machine 10, a width of a work implement 14 (work width), a width in which adjacent work areas overlap each other (lap width), work contents, a shape of the field F, and the like.

The autonomous traveling system may include an operation terminal (a tablet terminal, a smartphone, or the like) that is operated by the worker. The operation terminal can communicate with the work machine 10 via a communication network such as a mobile phone network, a packet network, or a wireless LAN. For example, the worker performs an operation to register various types of information (work machine information, field information, work information, and the like) on the operation terminal. Moreover, in a location away from the work machine 10, the worker can grasp travel status, work status, and the like of the work machine 10 by a travel trajectory displayed on the operation terminal. The operation terminal may be an operation device 17 (refer to FIG. 1) arranged in the work machine 10.

[Work Machine 10]

Figure 1:
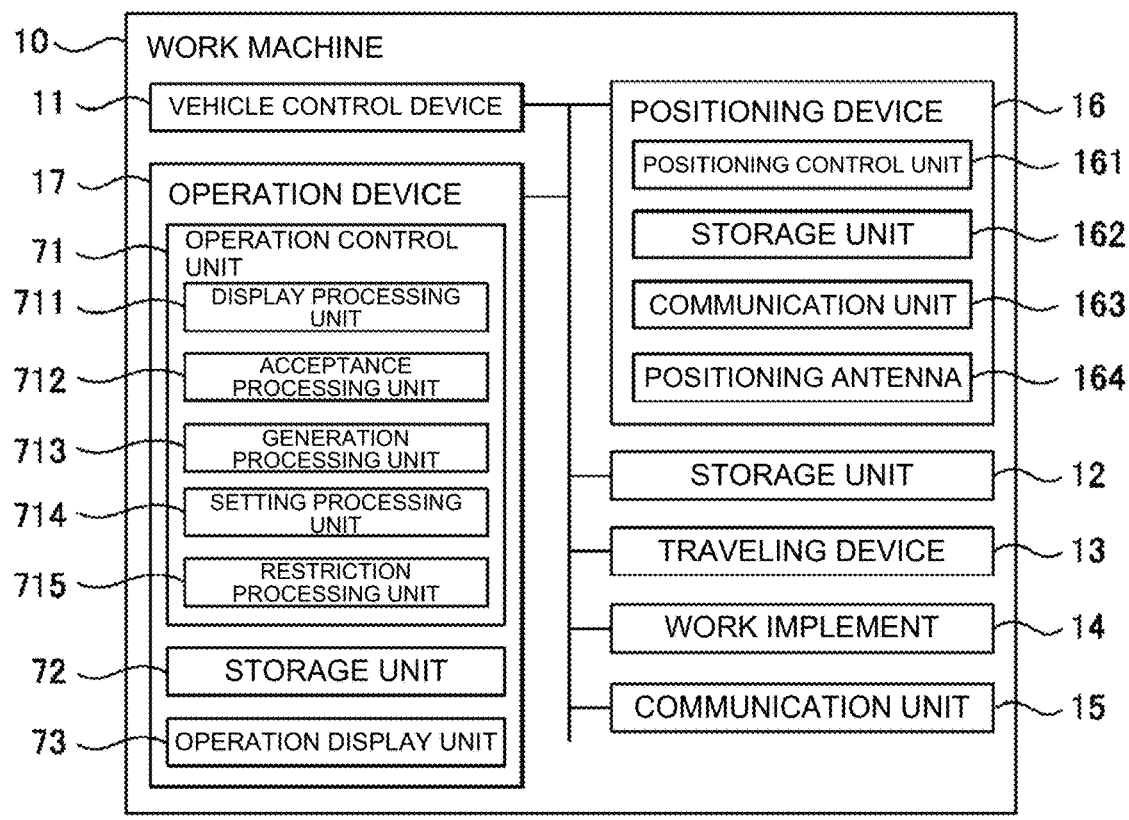
FIG. 1 is a block diagram illustrating a configuration of a work machine according to an embodiment of the present invention.
Figure 2:
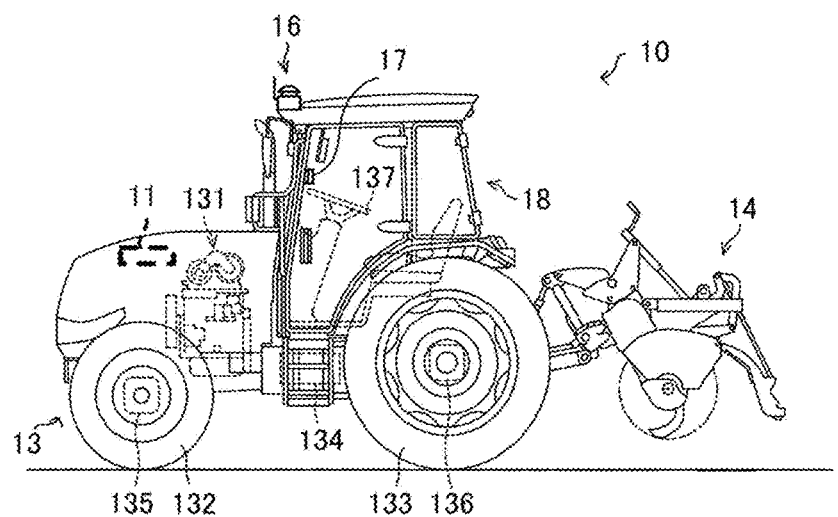
FIG. 2 is an external view illustrating an example of the work machine according to the embodiment of the present invention.

As illustrated in FIG. 1 and FIG. 2, the work machine 10 includes a vehicle control device 11, a storage unit 12, a traveling device 13, the work implement 14, a communication unit 15, a positioning device 16, and the operation device 17. The vehicle control device 11 is electrically connected to the storage unit 12, the traveling device 13, the work implement 14, the positioning device 16, the operation device 17, and the like. The vehicle control device 11 and the positioning device 16 may be capable of performing wireless communication. Moreover, the vehicle control device 11 and the operation device 17 may be capable of performing wireless communication.

The communication unit 15 is a communication interface that connects the work machine 10 to the communication network by wire or wirelessly and executes data communication in accordance with a predetermined communication protocol with an external device (operation terminal or the like) via the communication network.

The storage unit 12 is a non-volatile storage unit such as a hard disk drive (HDD) or a solid state drive (SSD) that stores various types of information. The storage unit 12 stores a control program such as an autonomous traveling program for causing the vehicle control device 11 to execute autonomous traveling processing. For example, the autonomous traveling program is non-transitorily recorded on a computer-readable recording medium such as a CD or a DVD, read by a predetermined reading device (not illustrated), and stored in the storage unit 12. The autonomous traveling program may be downloaded from a server (not illustrated) to the work machine 10 via the communication network to be stored in the storage unit 12. Moreover, the storage unit 12 may store data of the target route R to be generated in the operation device 17.

The traveling device 13 is a driving unit that causes the work machine 10 to travel. As illustrated in FIG. 2, the traveling device 13 includes an engine 131, front wheels 132, rear wheels 133, a transmission 134, a front axle 135, a rear axle 136, and a steering wheel 137. The front wheels 132 and the rear wheels 133 are provided on the right and left of the work machine 10, respectively. Moreover, the traveling device 13 is not limited to a wheel type including the front wheels 132 and the rear wheels 133, and may be a crawler type including crawlers provided on the right and left of the work machine 10.

The engine 131 is a driving source such as a diesel engine or a gasoline engine driven by using a fuel supplied to a non-illustrated fuel tank. The traveling device 13 may include an electric motor as a driving source, together with the engine 131 or instead of the engine 131. A non-illustrated generator is connected to the engine 131, and electric power is supplied from the generator to electric components such as the vehicle control device 11 provided in the work machine 10, a battery, and the like. The battery is charged by the electric power supplied from the generator. The electric components such as the vehicle control device 11, the positioning device 16, and the operation device 17 provided in the work machine 10 can be driven by the electric power supplied from the battery even after the engine 131 is stopped.

A driving force of the engine 131 is transmitted to the front wheels 132 via the transmission 134 and the front axle 135, and is transmitted to the rear wheels 133 via the transmission 134 and the rear axle 136. Moreover, the driving force of the engine 131 is transmitted to the work implement 14 via a PTO shaft (not illustrated). The traveling device 13 performs a traveling action in accordance with a command of the vehicle control device 11.

The work implement 14 is, for example, a tilling machine, a seeding machine, a mowing machine, a plow, a fertilizing machine, a spraying machine, or the like, and is attachable to and detachable from the work machine 10. Thus, the work machine 10 can perform various types of work using the respective work implements 14. FIG. 2 illustrates a case where the work implement 14 is a tilling machine.

In the work machine 10, the work implement 14 may be supported so as to be able to be lifted and lowered by a non-illustrated lifting-lowering mechanism. The vehicle control device 11 can lift and lower the work implement 14 by controlling the lifting-lowering mechanism. For example, the vehicle control device 11 lowers the work implement 14 to a work position when the worker performs, by a lifting-lowering lever 14L (refer to FIG. 3), an operation to lower the work implement 14 (for example, an operation to place the lifting-lowering lever 14L in a "lowering" position) and lifts the work implement 14 to a non-work position when the worker performs, by the lifting-lowering lever 14L, an operation to lift the work implement 14 (for example, an operation to place the lifting-lowering lever 14L in a "lifting" position). The lifting-lowering lever 14L is provided, for example, near the steering wheel 137 (refer to FIG. 3), but may be provided at another position in a cabin 18.

Moreover, when acquiring a work stop instruction, the vehicle control device 11 outputs a work stop command to the work implement 14. When acquiring the work stop instruction, the vehicle control device 11 stops driving of the PTO shaft to stop an action (work) of the work implement 14.

The steering wheel 137 is an operation unit that is operated by the worker or the vehicle control device 11. For example, the traveling device 13 changes an angle of the front wheels 132 by a hydraulic power steering mechanism (not illustrated) or the like in response to the operation of the steering wheel 137 by the worker or the vehicle control device 11 to change a traveling direction of the work machine 10.

Moreover, the traveling device 13 includes a main speed change lever, a PTO switch, a reverser lever, a shift lever, an accelerator, a clutch, and a brake. For example, the traveling device 13 increases the vehicle speed of the work machine 10 when the worker performs a speed increasing operation of increasing the vehicle speed of the work machine 10 by the main speed change lever, and decreases the vehicle speed of the work machine 10 when the worker performs a speed decreasing operation of decreasing the vehicle speed of the work machine 10 by the main speed change lever. The reverser lever is an operation tool for switching between forward movement and backward movement of the work machine 10 and can be set to "forward," "neutral," and "backward."

Moreover, for example, the traveling device 13 transmits the driving force of the engine 131 to the work implement 14 via the PTO shaft to activate the work implement 14 when the worker performs an operation to set the PTO switch to ON (for example, an operation to place the PTO switch in an "ON" position) and blocks the transmission of the driving force from the engine 131 to the work implement 14 to stop the action of the work implement 14 when the worker performs an operation to set the PTO switch to OFF (for example, an operation to place the PTO switch in an "OFF" position).

Moreover, the traveling device 13 brakes rotations of the front wheels 132 and the rear wheels 133 using an electromagnetic brake in response to an operation of the brake. Moreover, the traveling device 13 switches a gear of the transmission 134 to a forward gear, a backward gear, or the like in response to an operation of the shift lever and switches a traveling mode of the work machine 10 to forward, backward, or the like. Moreover, the traveling device 13 controls a rotation speed of the engine 131 in response to an operation of the accelerator. Moreover, the traveling device 13 brakes rotations of the front wheels 132 and the rear wheels 133 using an electromagnetic brake in response to an operation of the brake.

The positioning device 16 is a communication device including a positioning control unit 161, a storage unit 162, a communication unit 163, and a positioning antenna 164. For example, as illustrated in FIG. 2, the positioning device 16 is provided on the upper part of the cabin 18 on which the worker rides. Moreover, an installation location of the positioning device 16 is not limited to the cabin 18. Furthermore, the positioning control unit 161, the storage unit 162, the communication unit 163, and the positioning antenna 164 of the positioning device 16 may be dispersedly arranged at different positions in the work machine 10. As described above, the battery is connected to the positioning device 16, and the positioning device 16 can operate even when the engine 131 is stopped. Moreover, as the positioning device 16, for example, a mobile phone terminal, a smartphone, a tablet terminal, or the like may be substituted.

The positioning control unit 161 is a computer system including one or more processors and a storage memory such as a non-volatile memory or a RAM. The storage unit 162 is a non-volatile memory or the like that stores a positioning control program for causing the positioning control unit 161 to execute positioning processing and data such as positioning information and movement information. For example, the positioning control program is non-transitorily recorded on a computer-readable recording medium such as a CD or a DVD, read by a predetermined reading device (not illustrated), and stored in the storage unit 162. The positioning control program may be downloaded from a server (not illustrated) to the positioning device 16 via the communication network to be stored in the storage unit 162.

The communication unit 163 is a communication interface that connects the positioning device 16 to the communication network by wire or wirelessly and executes data communication in accordance with a predetermined communication protocol with an external device such as a base station server via the communication network.

The positioning antenna 164 is an antenna that receives a radio wave (GNSS signal) transmitted from a satellite.

The positioning control unit 161 calculates the current position of the work machine 10 on the basis of a GNSS signal received by the positioning antenna 164 from a satellite. For example, in a case where the work machine 10 autonomously travels in the field F, when the positioning antenna 164 receives radio waves (transmission time, orbit information, and the like) respectively transmitted from a plurality of satellites, the positioning control unit 161 calculates a distance between the positioning antenna 164 and each of the satellites and calculates the current position (latitude and longitude) of the work machine 10 on the basis of the calculated distance. Moreover, the positioning control unit 161 may perform positioning by a real-time kinematic method (RTK-GNSS positioning method (RTK method)) in which the current position of the work machine 10 is calculated using correction information corresponding to a base station (reference station) near the work machine 10. As described above, the work machine 10 autonomously travels using positioning information by the RTK method. The current position of the work machine 10 may be the same as the positioning position (for example, the position of the positioning antenna 164) or may be a position deviated from the positioning position. The positioning control unit 161 is an example of a positioning processing unit of the present invention.

The positional accuracy of positioning (positioning state) changes depending on the surrounding environment. The positional accuracy indicates a reception state of GNSS signals transmitted from satellites in the positioning device 16, and, for example, the positional accuracy increases as the number of the satellites that can receive the GNSS signals increases. For example, when the number of the satellites that can receive the GNSS signals decreases due to the presence of obstacles such as windbreak forests and buildings near the field F, the positional accuracy decreases. The positional accuracy is represented by, for example, an evaluation value of quality of the GNSS signals (GNSS Quality).

In a case where the positioning method is set to the RTK method in advance, when the engine 131 of the work machine 10 is started, the positioning control unit 161 starts to receive the GNSS signals transmitted from the satellites and executes the positioning processing until the positional accuracy reaches a high accuracy state ready for RTK positioning. For example, when the positional accuracy reaches the high accuracy state, the positioning control unit 161 transmits a notification of high accuracy positioning completion to the vehicle control device 11 and the operation device 17 (or the operation terminal). When the positional accuracy reaches a state of the high accuracy positioning completion, the vehicle control device 11 permits autonomous traveling by the RTK method. In other words, the vehicle control device 11 starts autonomous traveling of the work machine 10 by the RTK method on condition that the positional accuracy is in a high accuracy state ready for RTK positioning.

Figure 5:
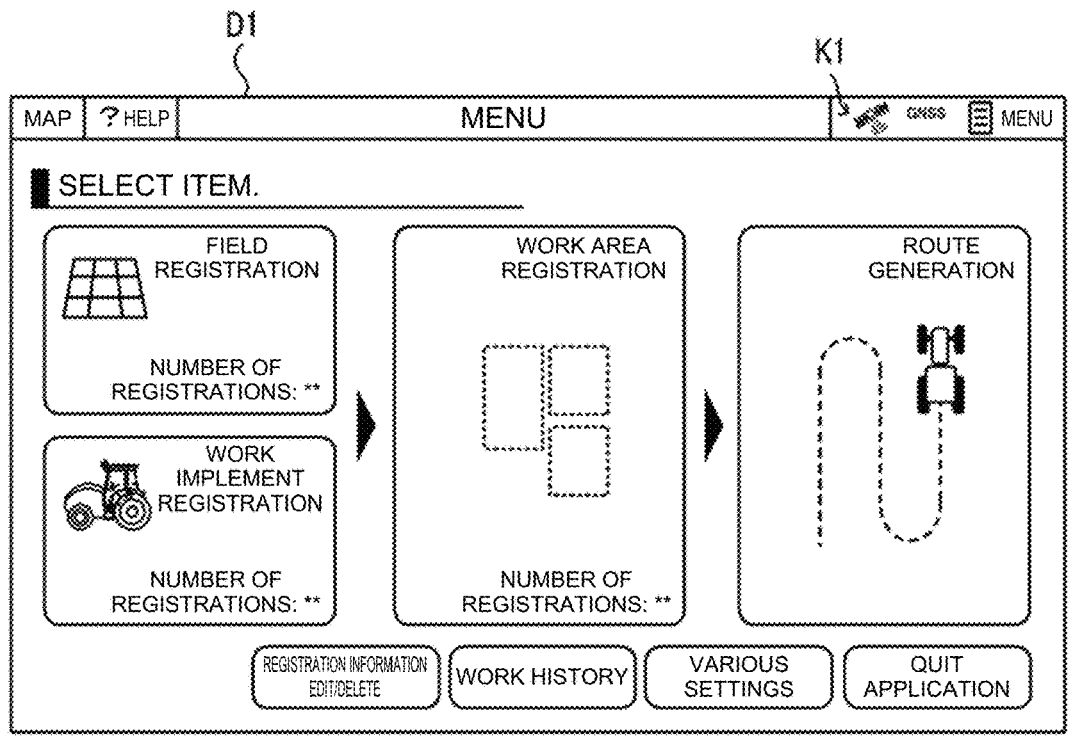
FIG. 5 is a diagram illustrating an example of a menu screen displayed on the operation device according to the embodiment of the present invention.

For example, when the worker starts the engine 131 of the work machine 10 and turns on the operation device 17 (or the operation terminal), a menu screen D1 (refer to FIG. 5) is displayed on the operation device 17.

Figure 6:
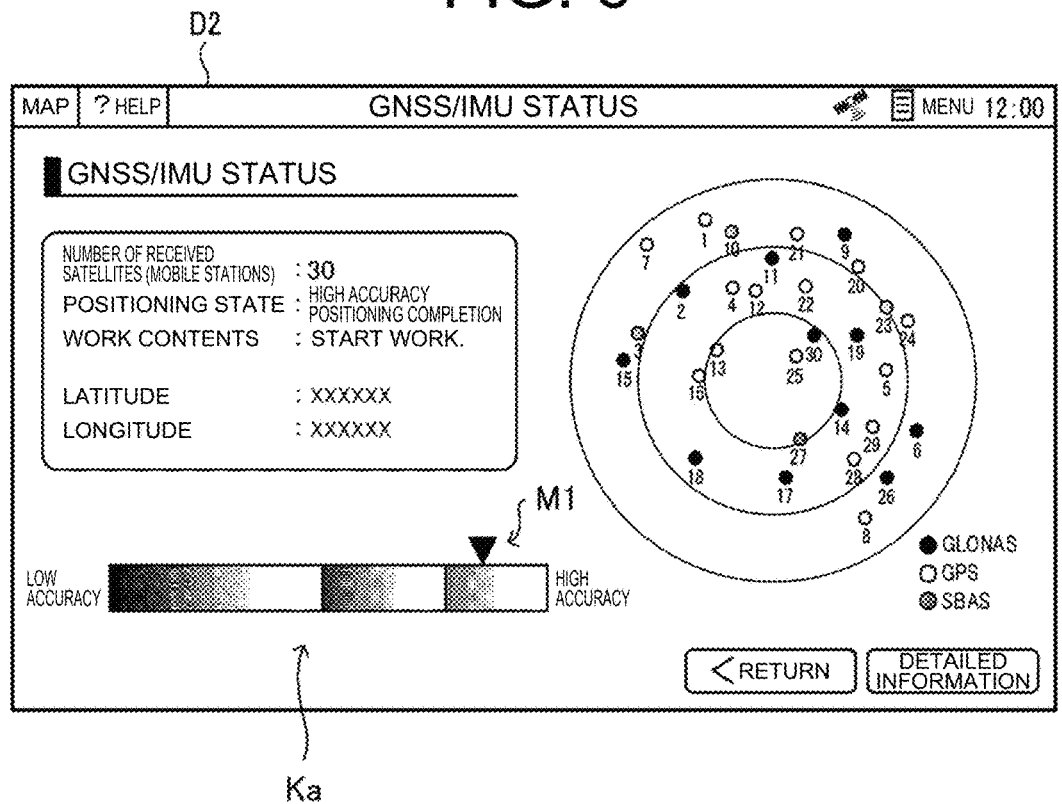
FIG. 6 is a diagram illustrating an example of a status screen displayed on the operation device according to the embodiment of the present invention.

The menu screen D1 displays various setting items such as field registration, work implement registration, work area registration, and route generation, an icon K1 representing the positional accuracy, and the like. When the worker presses the icon K1, a status screen D2 illustrated in FIG. 6 is displayed on the operation device 17. The status screen D2 displays the currently captured satellites, the number of the satellites, the positional accuracy (positioning state), and the like.

When the positional accuracy reaches the high accuracy state ready for RTK positioning, a message of the high accuracy positioning completion is displayed on the status screen D2. Moreover, an indicator Ka indicating the positional accuracy (details will be described below) is displayed on the status screen D2.

The operation device 17 is a device that is operated by the worker who rides on the work machine 10, and displays various types of information and accepts operations by the worker. Specifically, the operation device 17 displays various setting screens to accept various setting operations from the worker, and displays a guidance screen to display information about the traveling work machine 10. A specific configuration of the operation device 17 will be described below.

The vehicle control device 11 has control devices such as a CPU, a ROM, and a RAM. The CPU is a processor that executes various types of arithmetic processing. The ROM is a non-volatile storage unit that stores in advance control programs such as a BIOS and an OS for causing the CPU to execute various types of arithmetic processing. The RAM is a volatile or non-volatile storage unit that stores various types of information, and is used as a transitory storage memory (work area) for various types of processing executed by the CPU. The vehicle control device 11 controls the work machine 10 by causing the CPU to execute various types of control programs stored in advance in the ROM or the storage unit 12. Moreover, the vehicle control device 11 causes the CPU to execute various types of processing in accordance with the autonomous traveling program.

Specifically, the vehicle control device 11 controls the traveling of the work machine 10. For example, when a traveling mode of the work machine 10 is manual traveling (manual traveling mode), the vehicle control device 11 causes the work machine 10 to manually travel on the basis of an operation by the worker (manual steering). For example, the vehicle control device 11 acquires operation information corresponding to driving operations by the worker, such as a steering wheel operation, a speed change operation, a shift operation, an accelerator operation, and a brake operation, and causes the traveling device 13 to execute the traveling action on the basis of the operation information.

Moreover, when the traveling mode of the work machine 10 is autonomous traveling (autonomous traveling mode), the vehicle control device 11 causes the work machine 10 to autonomously travel on the basis of position information (positioning information) indicating the current position of the work machine 10, for which positioning is performed by the positioning control unit 161. For example, when the work machine 10 satisfies an autonomous traveling start condition and acquires a traveling start instruction from the worker, the vehicle control device 11 starts autonomous traveling of the work machine 10 on the basis of the positioning information (position information). Moreover, the vehicle control device 11 causes the work machine 10 to autonomously travel in accordance with the target route R (work route) (refer to FIG. 4) generated in advance.

Moreover, when the work machine 10 reaches an end (end point) of the work route, the vehicle control device 11 switches the traveling mode to manual traveling. The vehicle control device 11 may switch the traveling mode to the manual traveling when determining that the work machine 10 has reached the end point or may switch the traveling mode to the manual traveling in response to an operation by the worker. When the traveling mode is switched to the manual traveling, for example, the worker causes the work machine 10 to travel while turning (manually travel) by manual steering (refer to FIG. 4). The position of the end point of each work route is a position inside an end of the field F by a predetermined distance, a position specified in advance by the worker, a position aligned with the position where the worker has switched from the autonomous traveling to the manual traveling on an immediately preceding worked route (a position where the work route intersects with a line which passes through the position where the switching to the manual traveling has performed and is perpendicular to the worked route, or a position where the work route intersects with a line which passes through the position where the switching to the manual traveling has performed and is parallel to an edge line of the field F), a position where the work route intersects with a line which passes through a point B of a reference line L1 and is perpendicular to the reference line L1 (for example, a position Pe in FIG. 7C), or the like.

The end point of each work route on which the work machine 10 is caused to autonomously travel corresponds to a position of a start point of a non-work route (turning route) on which the work machine 10 is caused to manually travel, and a start point of each work route corresponds to a position of an end point of the non-work route (turning route).

As described above, the vehicle control device 11 switches the traveling mode in response to an operation by the worker on the operation device 17 to cause the work machine 10 to autonomously travel on the work route (target route R) by autonomous steering and to manually travel on the non-work route (turning route) by manual steering. The vehicle control device 11 is an example of a steering processing unit of the present invention. The vehicle control device 11 may cause the work machine 10 to autonomously travel on the target route R by autonomous steering in the entire field F without depending on the driving operations by the worker.

[Operation Device 17]

As illustrated in FIG. 1, the operation device 17 includes an operation control unit 71, a storage unit 72, and an operation display unit 73. The operation device 17 may be a device that is attachable to and detachable from the work machine 10. Moreover, the operation device 17 may be a mobile terminal (a tablet terminal, a smartphone, or the like) that can be carried by the worker. The operation device 17 is communicably connected to the vehicle control device 11 by wire or wirelessly.

The operation display unit 73 is a user interface including a display unit such as a liquid crystal display or an organic EL display, which displays various types of information, and an operation unit such as an operation button or a touch panel, which accepts operations. The operation display unit 73 displays various display screens in response to an instruction from the operation control unit 71. Moreover, the operation display unit 73 accepts an operation by the worker on each of the display screens.

Figure 3:
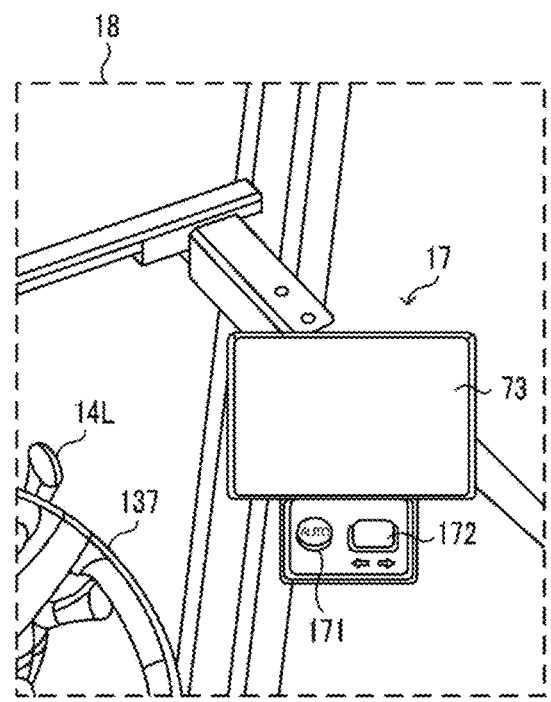
FIG. 3 is an external view illustrating an example of an operation device according to the embodiment of the present invention.

Moreover, the operation unit includes an autonomous traveling button 171 with which the worker issues a traveling start instruction when causing the work machine 10 to start autonomous traveling, and a shift button 172 with which a correction operation (shift operation) for correcting a positional deviation between the work machine 10 and the target route is performed (refer to FIG. 3). The autonomous traveling button 171 and the shift button 172 may be configured with physical buttons.

For example, as illustrated in FIG. 2 and FIG. 3, the operation device 17 is installed near the steering wheel 137 in the cabin 18.

The storage unit 72 is a non-volatile storage unit such as an HDD or an SSD that stores various types of information. The storage unit 72 stores a control program such as an autonomous traveling program for causing the operation device 17 to execute autonomous traveling processing. For example, the autonomous traveling program is non-transitorily recorded on a computer-readable recording medium such as a CD or a DVD, read by a predetermined reading device (not illustrated), and stored in the storage unit 72. The autonomous traveling program may be downloaded from a server (not illustrated) to the operation device 17 via the communication network to be stored in the storage unit 72. Moreover, the storage unit 72 may store data of the target route R to be generated in the operation device 17. Moreover, the autonomous traveling program may include a route generation program for generating the target route R.

The operation control unit 71 has control devices such as a CPU, a ROM, and a RAM. The CPU is a processor that executes various types of arithmetic processing. The ROM is a non-volatile storage unit that stores in advance control programs such as a BIOS and an OS for causing the CPU to execute various types of arithmetic processing. The RAM is a volatile or non-volatile storage unit that stores various types of information, and is used as a transitory storage memory (work area) for various types of processing executed by the CPU. The operation control unit 71 controls the operation device 17 by causing the CPU to execute various types of control programs stored in advance in the ROM or the storage unit 72.

Specifically, as illustrated in FIG. 1, the operation control unit 71 includes various processing units such as a display processing unit 711, an acceptance processing unit 712, a generation processing unit 713, a setting processing unit 714, and a restriction processing unit 715. The operation device 17 functions as the various processing units by causing the CPU to execute various types of processing in accordance with the control programs. Moreover, some or all of the processing units may be configured with electronic circuits. The control programs may be programs that cause a plurality of processors to function as the processing units.

The display processing unit 711 displays various types of information on the operation display unit 73. For example, the display processing unit 711 displays on the operation display unit 73 the menu screen D1 (refer to FIG. 5), the status screen D2 (refer to FIG. 6) for displaying information about the positional accuracy (positioning state), an operation screen when generating the target route R, an operation screen (guidance screen D3 of FIG. 8A to FIG. 8C) for displaying information about autonomous traveling (travel status, work status, and the like of the work machine 10), a setting screen for performing various settings, and the like.

The acceptance processing unit 712 accepts various operations by the worker. For example, the acceptance processing unit 712 accepts, from the worker, an operation to input setting information for causing the work machine 10 to autonomously travel, an operation to generate the target route R for autonomous traveling, an operation to start or stop autonomous traveling, and the like.

The generation processing unit 713 generates the target route R on which the work machine 10 is caused to autonomously travel. For example, the generation processing unit 713 generates the target route R including a plurality of straight routes (work routes) arranged at predetermined intervals (regular intervals) on the basis of the reference line L1 passing through a point A (first reference point) and the point B (second reference point) in the field F.

Hereinafter, an example of a procedure for generating the target route R will be described. For example, the display processing unit 711 displays on the operation display unit 73 an operation screen (not illustrated) that accepts, from the worker, a setting operation to set the reference line L1. The worker moves the work machine 10 to a desired position in the field F and presses a point A registration button (not illustrated). For example, the worker moves the work machine 10 to an outer peripheral end of the field F and presses the point A registration button. When the worker presses the point A registration button, the generation processing unit 713 registers the current position of the work machine 10 as a first reference point (point A). When the generation processing unit 713 registers the point A, the display processing unit 711 displays on the operation display unit 73 the operation screen (not illustrated) that accepts a registration operation of a second reference point (point B). The worker causes the work machine 10 to manually travel in a direction (target direction) in which the work machine 10 is desired to travel and work (refer to FIG. 7A).

Specifically, the worker causes the work machine 10 to travel straight ahead in a direction parallel to a work direction (for example, tilling direction) when the work machine 10 works in the work area. At this time, the work machine 10 may perform predetermined work (for example, tilling work) while manually traveling. Then, the worker presses a point B registration button (not illustrated) at a desired position (for example, the outer peripheral end of the field F). When the worker presses the point B registration button, the generation processing unit 713 registers the current position of the work machine 10 as a second reference point (point B).

Figure 7A:
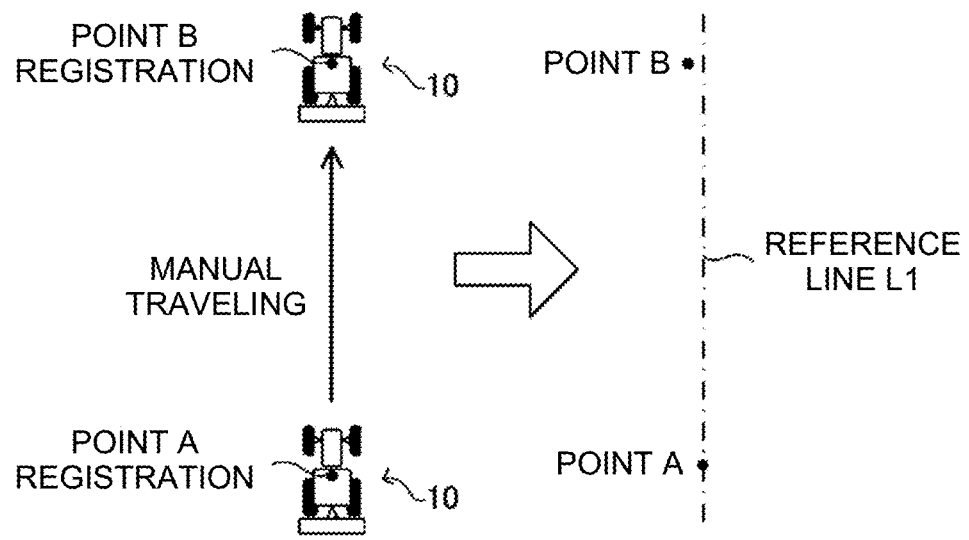
FIG. 7A is a diagram for explaining a generation method of the target route in the work machine according to the embodiment of the present invention.

When acquiring position information of the point A and the point B, the generation processing unit 713 sets a straight line passing through the point A and the point B as the reference line L1 (refer to FIG. 7A). The generation processing unit 713 may be capable of adjusting an orientation of the generated reference line L1. For example, the generation processing unit 713 displays the generated reference line L1 on the operation screen and sets (registers) the reference line L1 when the registration operation is accepted from the worker. In contrast, when accepting an operation to change the orientation of the reference line L1 (for example, a screen touch operation) from the worker, the generation processing unit 713 adjusts the orientation of the reference line L1 in response to the operation. When accepting the operation to register the point B, the generation processing unit 713 may display a selection screen for registering or adjusting the reference line L1.

Figure 7B:
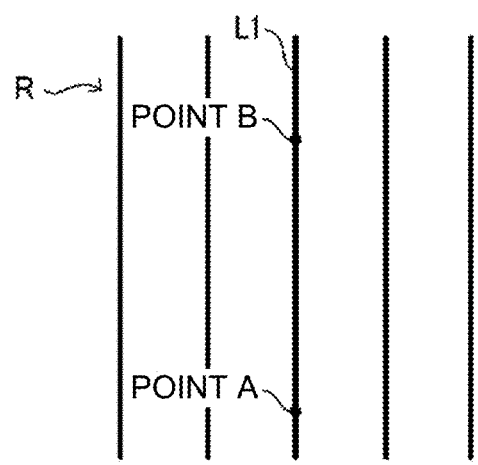
FIG. 7B is a diagram for explaining the generation method of the target route in the work machine according to the embodiment of the present invention.
Figure 7C:
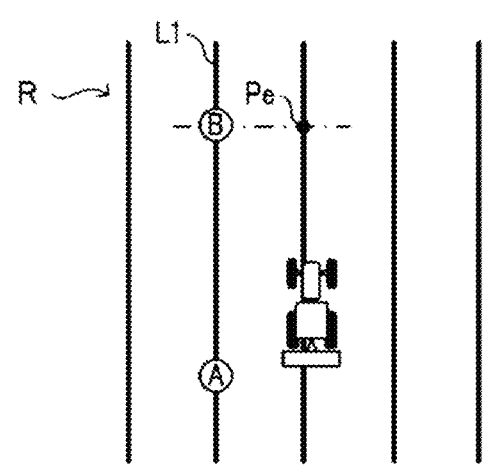
FIG. 7C is a diagram for explaining the generation method of the target route in the work machine according to the embodiment of the present invention.

The generation processing unit 713 generates a travel route (target route R) including the reference line L1 and a plurality of straight lines parallel to the reference line L1. For example, the generation processing unit 713 generates a plurality of parallel straight lines at regular intervals with reference to the reference line L1 on the basis of a work width (a lateral width of the work implement 14) and a lap width (a width that overlaps an adjacent worked area) set in advance (refer to FIG. 7B). The generation processing unit 713 registers the generated target route R in the storage unit 72 and displays the generated target route R on the operation display unit 73.

According to the above-described method, the target route R can be generated using the reference line L1 passing through the two points (point A and point B) at both ends of the field F (refer to FIG. 4), and thus the work accuracy by the work machine 10 can be improved. The generation processing unit 713 may be capable of registering the point B when the work machine 10 has traveled a predetermined distance (for example, 5 m) after registering the point A. Thus, the reference line L1 having higher accuracy can be set.

Figure 8A:
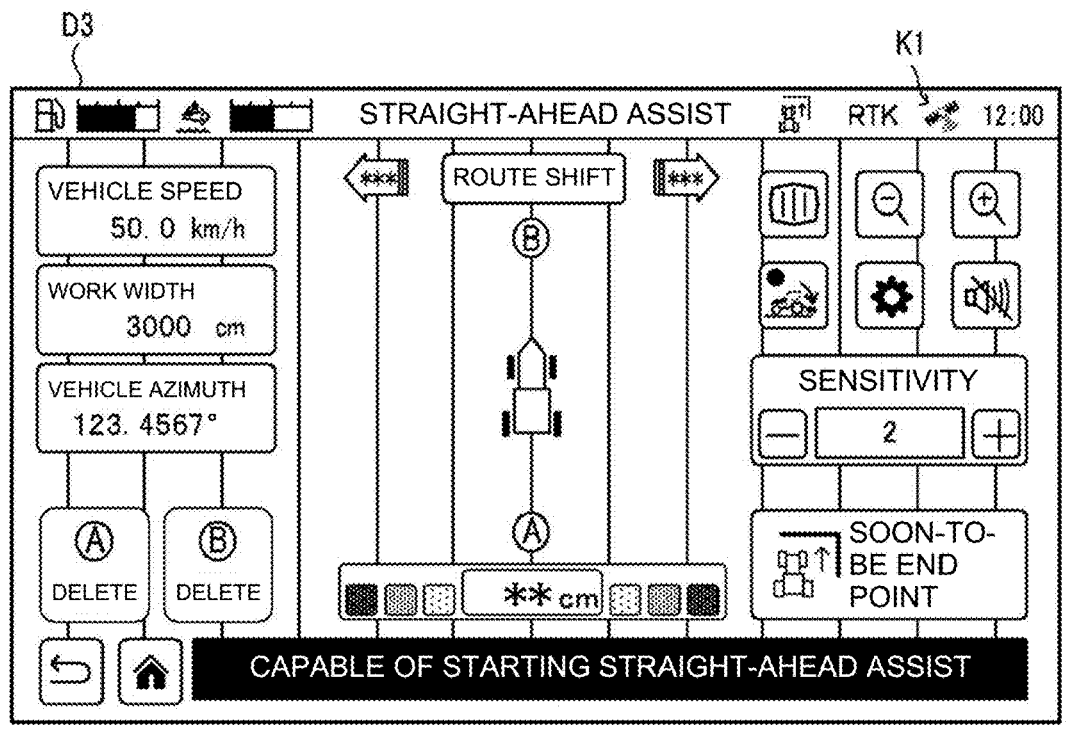
FIG. 8A is a diagram illustrating an example of a guidance screen displayed on the operation device according to the embodiment of the present invention.

After the target route R is generated, the worker issues an instruction to the work machine 10 to start autonomous traveling in the field F (traveling start instruction). For example, when the work machine 10 satisfies the autonomous traveling start condition and enters a state where autonomous traveling is possible since the positional accuracy reaches the high accuracy state ready for RTK positioning and the work machine 10 is located within a predetermined distance from the target route R and within a predetermined orientation with respect to the target route R (refer to FIG. 7C), the display processing unit 711 displays the guidance screen D3 illustrated in FIG. 8A. Moreover, the display processing unit 711 displays, on the guidance screen D3, a message indicating that the work machine 10 has entered a state where autonomous traveling is possible (for example, "capable of starting straight-ahead assist"). The guidance screen D3 illustrated in FIG. 8A is an example of an acceptance screen that accepts an instruction to start autonomous traveling of the work machine 10 from the worker.

Subsequently, the worker presses the autonomous traveling button 171 (refer to FIG. 3) to issue the traveling start instruction. When the worker presses the autonomous traveling button 171 in a state where the guidance screen D3 is displayed on the operation device 17, the vehicle control device 11 accepts the traveling start instruction and starts autonomous traveling of the work machine 10 such that the work machine 10 follows the target route R. As illustrated in FIG. 4, the work machine 10 executes predetermined work while autonomously traveling on a work route included in the target route R, and switches to manual traveling at the end point of the work route to travel while turning on a turning route by manual steering by the worker.

Figure 8B:
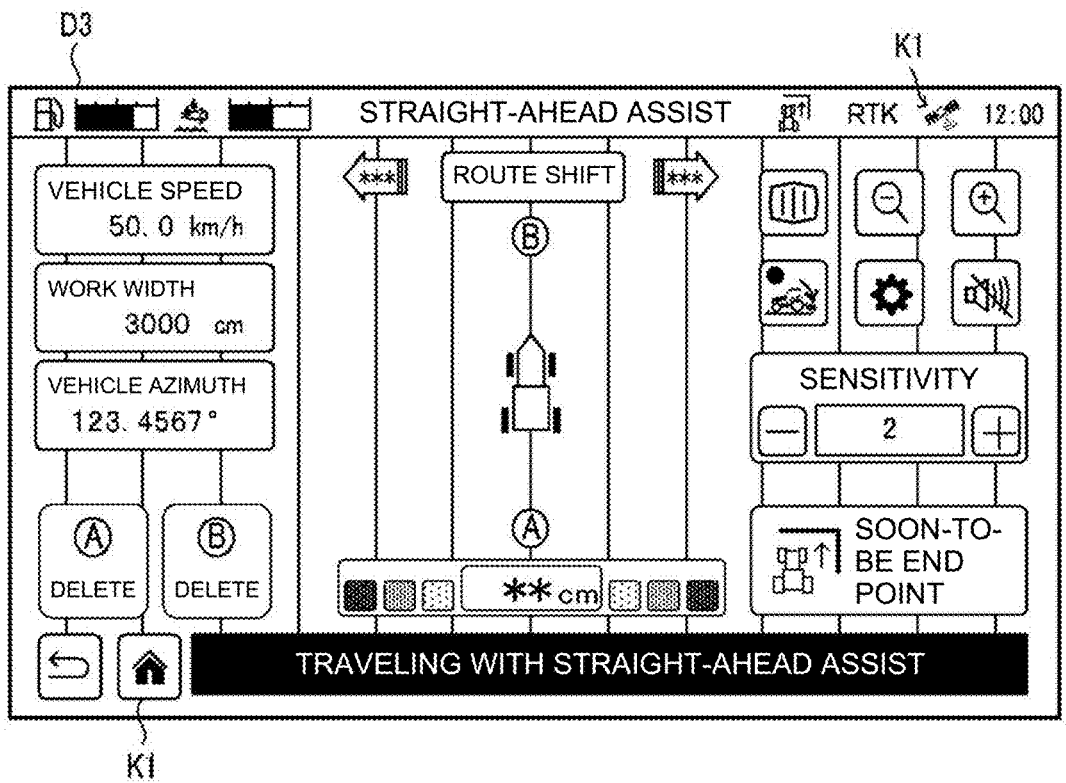
FIG. 8B is a diagram illustrating an example of the guidance screen displayed on the operation device according to the embodiment of the present invention.
Figure 8C:
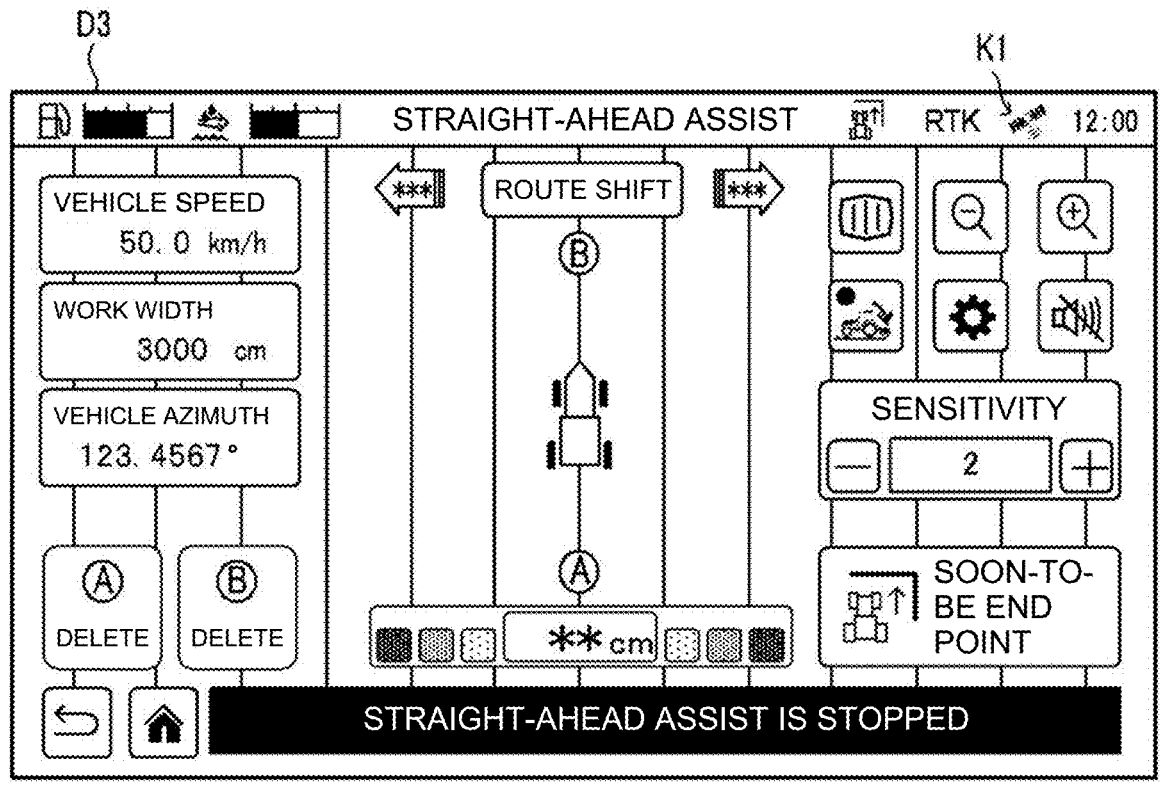
FIG. 8C is a diagram illustrating an example of the guidance screen displayed on the operation device according to the embodiment of the present invention.

Moreover, when the autonomous traveling of the work machine 10 is started, the display processing unit 711 displays, on the guidance screen D3, a message indicating that the work machine 10 is autonomously traveling (for example, "traveling with straight-ahead assist"), as illustrated in FIG. 8B. Moreover, the display processing unit 711 displays the icon K1 on the guidance screen D3 in a display mode corresponding to the positional accuracy while the autonomous traveling.

Figure 9:
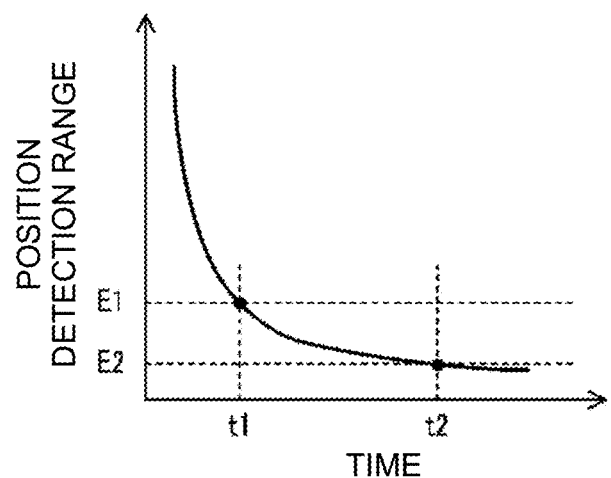
FIG. 9 is a graph illustrating a change of positional accuracy of positioning according to the embodiment of the present invention.

Here, the conventional problem will be described with reference to specific examples. FIG. 9 is a graph illustrating a change of the positional accuracy of positioning. In the graph illustrated in FIG. 9, the horizontal axis represents the passage of time, and the vertical axis represents the positional accuracy (detection error range). For example, the positional accuracy is E1 at time t1 after the start of positioning, and the positional accuracy is E2, which is higher than E1, at time t2 thereafter. The positional accuracy corresponds to the detection error range of a position. Therefore, as the detection error range becomes narrower, the error of a detection position with respect to the current position of the work machine 10 becomes smaller, and thus the positional accuracy becomes higher. As the detection error range becomes wider, the error of the detection position with respect to the current position of the work machine 10 becomes larger, and thus the positional accuracy becomes lower. For example, in a conventional system, when a threshold value of the positional accuracy for setting a reference route (reference line L1) is set to Th1, the system sets the reference line L1 on condition that the positional accuracy is higher than the threshold value Th1.

Figure 10A:
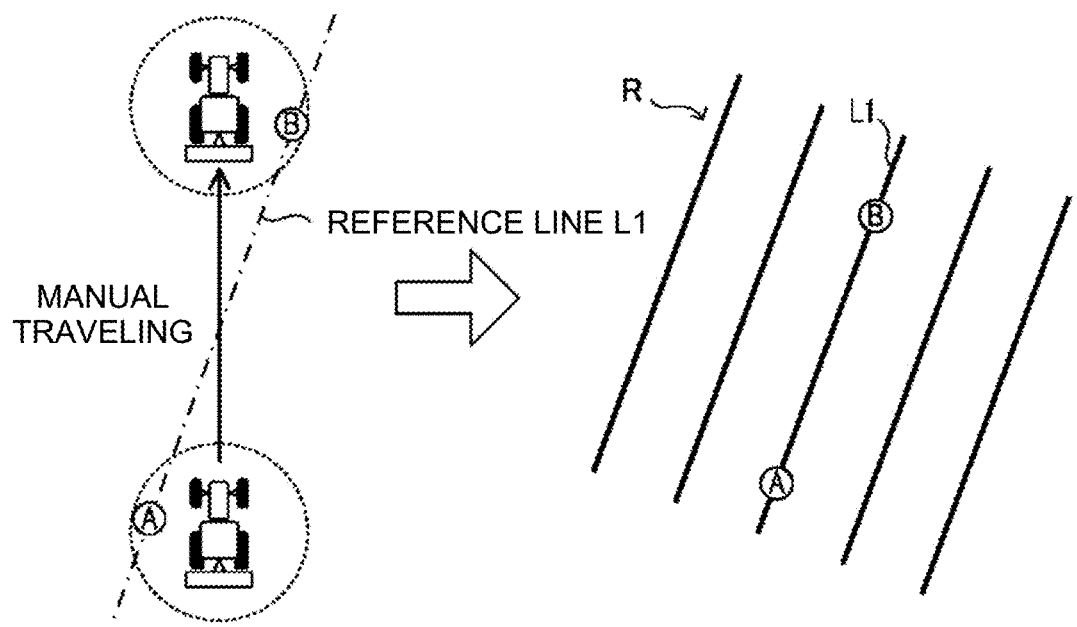
FIG. 10A is a diagram illustrating an example of a setting method of a reference line based on a point A and a point B.
Figure 10B:
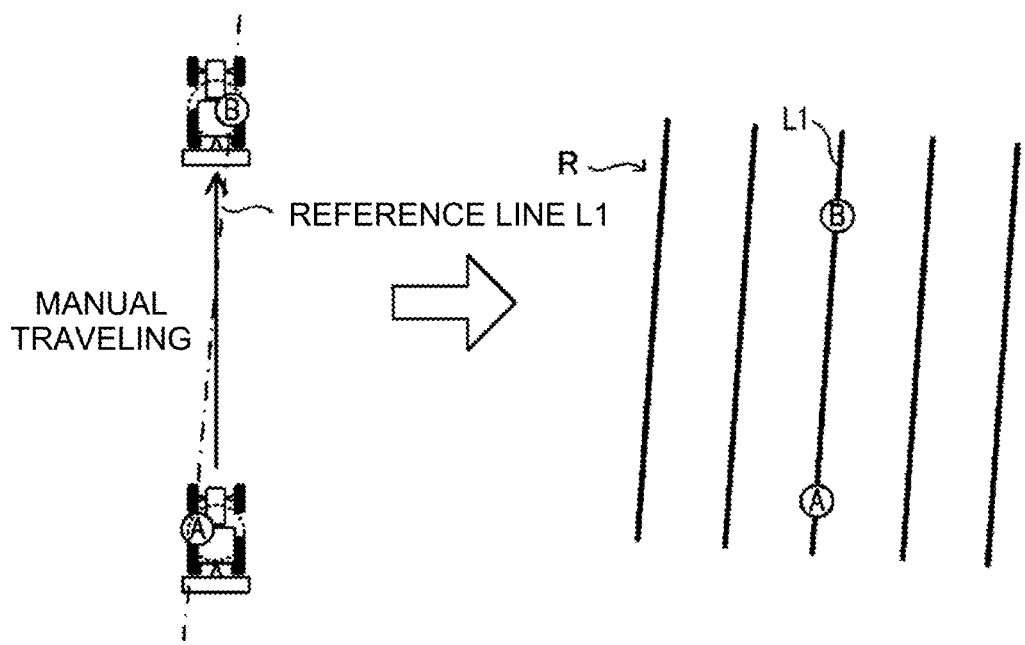
FIG. 10B is a diagram illustrating an example of the setting method of the reference line based on the point A and the point B.

FIG. 10A illustrates the reference line L1 set when the positional accuracy is E1 (refer to FIG. 9), and FIG. 10B illustrates the reference line L1 set when the positional accuracy is E2 (refer to FIG. 9).

In FIG. 10A and FIG. 10B, the range surrounded by the dotted line corresponds to the detection error range. As illustrated in FIG. 10A, for example, even if the positional accuracy satisfies the condition of the threshold value Th1, when the positional accuracy is low (when the detection error range is wide), the deviation of the detection position (positioning position) with respect to the current position of the work machine 10 becomes large, and thus the reference line L1 deviated from the route between the point A and the point B (the route indicated by the arrow) on which the work machine 10 has actually traveled is generated. In contrast, as illustrated in FIG. 10B, if the positional accuracy satisfies the condition of the threshold value Th1, when the positional accuracy is high (when the detection error range is narrow), the deviation of the detection position (positioning position) with respect to the current position of the work machine 10 becomes small, and thus the reference line L1 similar to the route between the point A and the point B (the route indicated by the arrow) on which the work machine 10 has actually traveled can be generated.

As described above, the generated reference line L1 varies depending on the positional accuracy. In the conventional system, since the threshold value that is a determination condition of the positional accuracy is uniformly set, for example, in a case where the required positional accuracy is different depending on the type of work, the threshold value has higher accuracy than necessary or has insufficiently low accuracy, and thus a situation in which the reference route cannot be appropriately set or the autonomous traveling cannot be started occurs, thereby causing a problem of decreasing the work efficiency. In contrast, the autonomous traveling system according to the present embodiment has a configuration capable of improving the work efficiency of the work machine 10 that can perform autonomous traveling, as described below.

Specifically, the setting processing unit 714 sets an allowable range (an allowable range of the positional accuracy of positioning) or a threshold value (a threshold value of the positional accuracy) for permitting the execution of predetermined processing related to the autonomous traveling on the basis of a user operation or work information in the work machine 10. The restriction processing unit 715 permits the predetermined processing related to the autonomous traveling when the positional accuracy of positioning is within the allowable range, and prohibits the predetermined processing related to the autonomous traveling when the positional accuracy of positioning is out of the allowable range. The predetermined processing is, for example, processing of setting a reference route (reference line L1) for autonomous traveling, processing of causing the work machine 10 to start autonomous traveling, processing of continuing autonomous traveling when the positional accuracy decreases while the work machine 10 autonomously travels, or the like.

For example, the setting processing unit 714 sets the allowable range on the basis of the type of work by the work machine 10 or the type of the work implement 14 connected to the work machine 10.

Specifically, the setting processing unit 714 sets a different allowable range for each type of work. For example, the setting processing unit 714 sets an allowable range Ta1 (an example of a first allowable range of the present invention) in the case of work A (an example of first work of the present invention) requiring first positional accuracy (refer to FIG. 11A), and sets an allowable range Tb1 (an example of a second allowable range of the present invention) narrower than the allowable range Ta1 in the case of work B (an example of second work of the present invention) requiring positional accuracy higher than the first positional accuracy (refer to FIG. 11B). In other words, the setting processing unit 714 sets a threshold value that is a permission condition of the predetermined processing to Ha1 in the case of the work A (refer to FIG. 11A), and sets the threshold value to Hb1 having higher accuracy (having a smaller detection error range) than Ha1 in the case of the work B (refer to FIG. 11B).

The display processing unit 711 displays the indicator Ka in which the allowable range is set (refer to FIG. 11A and FIG. 11B) on the status screen D2 (refer to FIG. 6).

Moreover, the setting processing unit 714 may set a different allowable range for each type of the work implement 14. For example, the setting processing unit 714 sets the allowable range Ta1 in the case of the work implement 14 of the work A requiring the first positional accuracy (refer to FIG. 11A), and sets the allowable range Tb1 narrower than the allowable range Ta1 in the case of the work implement 14 of the work B requiring positional accuracy higher than the first positional accuracy (refer to FIG. 11B). In other words, the setting processing unit 714 sets a threshold value that is a permission condition of the predetermined processing to Ha1 in the case of the work implement 14 of the work A (refer to FIG. 11A), and sets the threshold value to Hb1 having higher accuracy (having a smaller detection error range) than Ha1 in the case of the work implement 14 of the work B (refer to FIG. 11B).

The work A is, for example, tilling, spraying, or fertilizing, and the work B is, for example, ridging, levee plastering, seeding, or planting.

For example, in a case where the type of work selected by the worker is spraying or the work implement 14 is a spraying machine, the restriction processing unit 715 permits the processing of setting the reference line L1 and generating the target route R on condition that the positional accuracy of positioning is within the allowable range Ta1 (less than the threshold value Ha1). In contrast, in a case where the type of work selected by the worker is spraying or the work implement 14 is a spraying machine, the restriction processing unit 715 prohibits the processing of setting the reference line L1 and generating the target route R when the positional accuracy of positioning is out of the allowable range Ta1 (the threshold value Ha1 or more). For example, the restriction processing unit 715 prohibits processing of registering the point A and the point B when the positional accuracy of positioning is low (for example, out of the allowable range Ta1 (the threshold value Ha1 or more)) as illustrated in FIG. 10A, and permits the processing of registering the point A and the point B when the positional accuracy of positioning is high (for example, within the allowable range Ta1 (less than the threshold value Ha1)) as illustrated in FIG. 10B.

Moreover, for example, in a case where the type of work selected by the worker is ridging or the work implement 14 is a ridging machine, the restriction processing unit 715 permits the processing of setting the reference line L1 and generating the target route R on condition that the positional accuracy of positioning is within the allowable range Tb1 (less than the threshold value Hb1). In contrast, in a case where the type of work selected by the worker is ridging or the work implement 14 is a ridging machine, the restriction processing unit 715 prohibits the processing of setting the reference line L1 and generating the target route R when the positional accuracy of positioning is out of the allowable range Tb1 (the threshold value Hb1 or more). For example, the restriction processing unit 715 prohibits the processing of registering the point A and the point B when the positional accuracy of positioning is low (for example, out of the allowable range Tb1 (the threshold value Hb1 or more)), and permits the processing of registering the point A and the point B when the positional accuracy of positioning is high (for example, within the allowable range Tb1 (less than the threshold value Hb1)).

Moreover, for example, in a case where the type of work selected by the worker is spraying or the work implement 14 is a spraying machine, the restriction processing unit 715 permits the processing of causing the work machine 10 to start autonomous traveling on condition that the positional accuracy of positioning is within the allowable range Ta1 (less than the threshold value Ha1). In contrast, in a case where the type of work selected by the worker is spraying or the work implement 14 is a spraying machine, the restriction processing unit 715 prohibits the processing of causing the work machine 10 to start autonomous traveling when the positional accuracy of positioning is out of the allowable range Ta1 (the threshold value Ha1 or more). For example, the restriction processing unit 715 prohibits the processing of starting autonomous traveling when the positional accuracy of positioning is low (out of the allowable range Ta1 (the threshold value Ha1 or more)), and permits the processing of starting autonomous traveling when the positional accuracy of positioning is high (within the allowable range Ta1 (less than the threshold value Ha1)).

Moreover, for example, in a case where the type of work selected by the worker is ridging or the work implement 14 is a ridging machine, the restriction processing unit 715 permits the processing of causing the work machine 10 to start autonomous traveling on condition that the positional accuracy of positioning is within the allowable range Tb1 (less than the threshold value Hb1). In contrast, in a case where the type of work selected by the worker is ridging or the work implement 14 is a ridging machine, the restriction processing unit 715 prohibits the processing of causing the work machine 10 to start autonomous traveling when the positional accuracy of positioning is out of the allowable range Tb1 (the threshold value Hb1 or more). For example, the restriction processing unit 715 prohibits the processing of starting autonomous traveling when the positional accuracy of positioning is low (out of the allowable range Tb1 (the threshold value Hb1 or more)), and permits the processing of starting autonomous traveling when the positional accuracy of positioning is high (within the allowable range Tb1 (less than the threshold value Hb1)).

As described above, in the case of spraying work not requiring high positional accuracy, the processing of generating the target route R and the processing of starting autonomous traveling are permitted even when the positional accuracy is low. In contrast, in the case of ridging work requiring high positional accuracy, the processing of generating the target route R and the processing of starting autonomous traveling are prohibited when the positional accuracy is low, and the processing of generating the target route R and the processing of starting autonomous traveling are permitted on condition that the positional accuracy is high.

Moreover, the setting processing unit 714 may set a plurality of allowable ranges for each type of work or each type of a work implement. For example, the setting processing unit 714 sets an allowable range Ta2 (an example of a first allowable range of the present invention) including a range in which the positional accuracy is lower than the allowable range Ta1 in the case of the work A requiring the first positional accuracy (refer to FIG. 11A), and sets an allowable range Tb2 (an example of a second allowable range of the present invention) including a range in which the positional accuracy is lower than the allowable range Tb1 and narrower than the allowable range Ta2 in the case of the work B requiring positional accuracy higher than the first positional accuracy (refer to FIG. 11B). In other words, the setting processing unit 714 sets a threshold value that is a permission condition of the predetermined processing to Ha2 in the case of the work A (refer to FIG. 11A), and sets the threshold value to Hb2 having higher accuracy (having a smaller detection error range) than Ha2 in the case of the work B (refer to FIG. 11B).

Figure 11A:
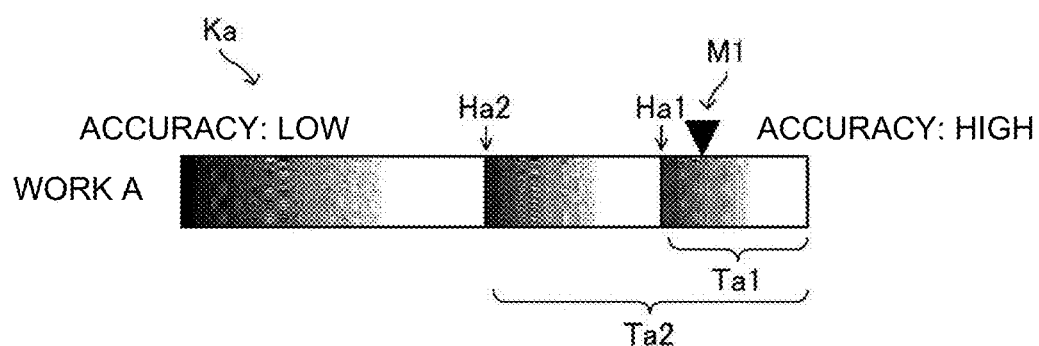
FIG. 11A is a diagram illustrating an example of an indicator according to the embodiment of the present invention.
Figure 11B:
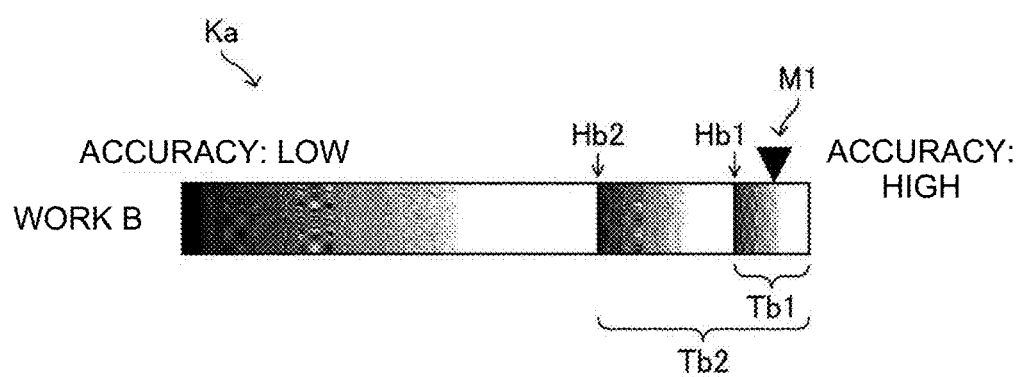
FIG. 11B is a diagram illustrating an example of the indicator according to the embodiment of the present invention.

Moreover, the setting processing unit 714 sets the allowable range Ta2 including a range in which the positional accuracy is lower than the allowable range Ta1 in the case of the work implement 14 of the work A requiring the first positional accuracy (refer to FIG. 11A), and sets the allowable range Tb2 including a range in which the positional accuracy is lower than the allowable range Tb1 and narrower than the allowable range Ta2 in the case of the work implement 14 of the work B requiring positional accuracy higher than the first positional accuracy (refer to FIG. 11B). In other words, the setting processing unit 714 sets a threshold value that is a permission condition of the predetermined processing to Ha2 in the case of the work implement 14 of the work A (refer to FIG. 11A), and sets the threshold value to Hb2 having higher accuracy (having a smaller detection error range) than Ha2 in the case of the work implement 14 of the work B (refer to FIG. 11B).

The restriction processing unit 715 permits or prohibits the predetermined processing on the basis of the allowable range corresponding to the current positional accuracy among the plurality of allowable ranges. For example, in a case where the type of work selected by the worker is spraying or the work implement 14 is a spraying machine, the restriction processing unit 715 permits the processing of causing the work machine 10 to continue autonomous traveling on condition that the positional accuracy of positioning of the work machine 10 while autonomously traveling is within the allowable range Ta2 (less than the threshold value Ha2). In contrast, in a case where the type of work selected by the worker is spraying or the work implement 14 is a spraying machine, the restriction processing unit 715 prohibits the processing of causing the work machine 10 to continue autonomous traveling and stops the work machine 10 (interrupts autonomous traveling) when the positional accuracy of positioning of the work machine 10 while autonomously traveling is out of the allowable range Ta2 (the threshold value Ha2 or more). For example, after the autonomous traveling is started, the restriction processing unit 715 prohibits the processing of continuing autonomous traveling when the positional accuracy of positioning becomes low to be out of the allowable range Ta2 (the threshold value Ha2 or more), and permits the processing of continuing autonomous traveling while the positional accuracy of positioning is maintained in a high state (while being within the allowable range Ta2 (less than the threshold value Ha2)).

Moreover, for example, in a case where the type of work selected by the worker is ridging or the work implement 14 is a ridging machine, the restriction processing unit 715 permits the processing of causing the work machine 10 to continue autonomous traveling on condition that the positional accuracy of positioning of the work machine 10 while autonomously traveling is within the allowable range Tb2 (less than the threshold value Hb2). In contrast, in a case where the type of work selected by the worker is ridging or the work implement 14 is a ridging machine, the restriction processing unit 715 prohibits the processing of causing the work machine 10 to continue autonomous traveling and stops the work machine 10 when the positional accuracy of positioning of the work machine 10 while autonomously traveling is out of the allowable range Tb2 (the threshold value Hb2 or more). For example, after the autonomous traveling is started, the restriction processing unit 715 prohibits the processing of continuing autonomous traveling when the positional accuracy of positioning becomes low to be out of the allowable range Tb2 (the threshold value Hb2 or more), and permits the processing of continuing autonomous traveling while the positional accuracy of positioning is maintained in a high state (while being within the allowable range Tb2 (less than the threshold value Hb2)).

As described above, the setting processing unit 714 sets the allowable range (the threshold value of the positional accuracy) on the basis of the work information (the type of work, the type of the work implement 14, or the like) in the work machine 10, and the restriction processing unit 715 permits the predetermined processing related to the autonomous traveling when the positional accuracy of positioning is within the allowable range and prohibits the predetermined processing related to the autonomous traveling when the positional accuracy of positioning is out of the allowable range. The setting processing unit 714 is an example of a setting processing unit of the present invention, and the restriction processing unit 715 is an example of a restriction processing unit of the present invention.

As another embodiment, the setting processing unit 714 may set the allowable range on the basis of a user operation. Specifically, the setting processing unit 714 accepts, from the worker, an operation of selecting the type of work by the work machine 10, and an operation of selecting the allowable range, and sets the allowable range selected by the worker. For example, the setting processing unit 714 displays a selection field for selecting the type of work or the work implement 14 and a setting field for setting the allowable range on the setting screen, and sets the type of work or the work implement 14 and the allowable range in response to the operation by the worker. For example, the indicator Ka (refer to FIG. 11A and the like) may be displayed on the status screen D2 (refer to FIG. 6), and the worker may set the allowable ranges Ta1 and Ta2 by sliding the positions of the threshold values Ha1 and Ha2 of the indicator. Thus, the allowable range in response to a request of the worker can be set.

In the above-described example, as the predetermined processing, the processing of setting the reference route (reference line L1) for autonomous traveling, the processing of causing the work machine 10 to start autonomous traveling, and the processing of continuing autonomous traveling when the positional accuracy decreases while the work machine 10 autonomously travels have been exemplified, but the predetermined processing of the present invention is not limited thereto.

Other examples of the predetermined processing may include processing of shifting the target route R (route offset) and processing of causing the work machine 10 to move backward (autonomously backward travel). For example, in a case where the work machine 10 performs the work A (refer to FIG. 11A), the restriction processing unit 715 permits the route offset when the positional accuracy of the work machine 10 while autonomously traveling is within the allowable range Ta1, and prohibits the route offset when the positional accuracy is out of the allowable range Ta1. In contrast, for example, in a case where the work machine 10 performs the work B (refer to FIG. 11B), the restriction processing unit 715 permits the route offset when the positional accuracy of the work machine 10 while autonomously traveling is within the allowable range Tb1, and prohibits the route offset when the positional accuracy is out of the allowable range Tb1.

Moreover, for example, in a case where the work machine 10 performs the work A (refer to FIG. 11A), the restriction processing unit 715 permits the autonomous backward travel when the positional accuracy of the work machine 10 while autonomously traveling is within the allowable range Ta2, and prohibits the autonomous backward travel when the positional accuracy is out of the allowable range Ta2. In contrast, for example, in a case where the work machine 10 performs the work B (refer to FIG. 11B), the restriction processing unit 715 permits the autonomous backward travel when the positional accuracy of the work machine 10 while autonomously traveling is within the allowable range Tb2, and prohibits the autonomous backward travel when the positional accuracy is out of the allowable range Tb2.

The predetermined processing is not limited to processing executed by the work machine 10, and may be processing corresponding to a user operation. For example, the restriction processing unit 715 may permit or prohibit acceptance of a user operation of registering the point A and the point B, or may permit or prohibit acceptance of a user operation of providing an instruction to start autonomous traveling.

Figure 12:
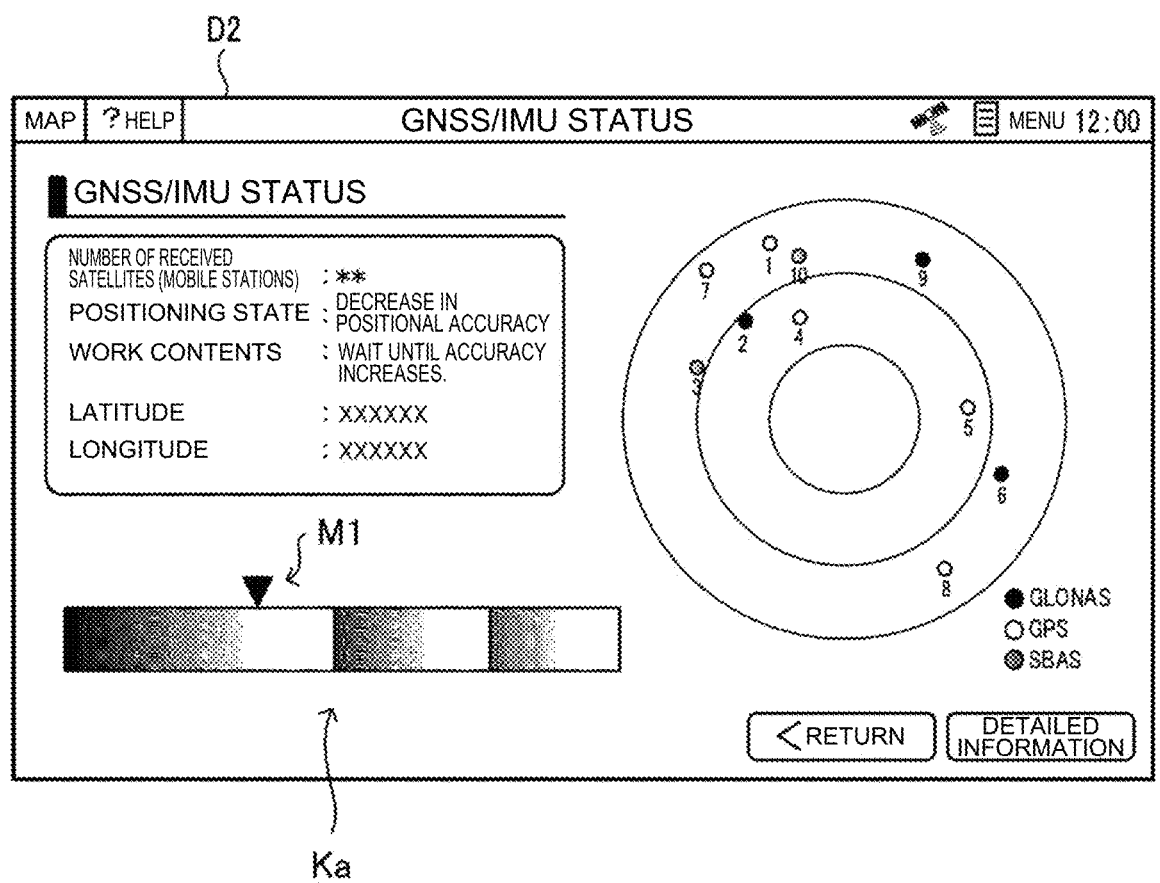
FIG. 12 is a diagram illustrating an example of the status screen displayed on the operation device according to the embodiment of the present invention.

The display processing unit 711 may identifiably display the current positional accuracy of positioning of the work machine 10. Specifically, the display processing unit 711 displays, on the guidance screen D3 (refer to FIG. 8A to FIG. 8C), the icon K1 in a color corresponding to the positional accuracy. Moreover, when the worker presses (touch operation) the icon K1, the display processing unit 711 displays the status screen D2 (refer to FIG. 6), and displays, on the status screen D2, the indicator Ka (an example of a reference image of the present invention) (refer to FIG. 11A and FIG. 11B) indicating from the lower limit to the upper limit of the positional accuracy. Moreover, in the indicator Ka, the display processing unit 711 identifiably displays the allowable range (compartment display), and displays a mark M1 with which the current positional accuracy of positioning of the work machine 10 can be identified. FIG. 6 illustrates the indicator Ka and the mark M1 in a state where the positional accuracy is high and the autonomous traveling can be started, and FIG. 12 illustrates the indicator Ka and the mark M1 in a state where the positional accuracy decreases and the autonomous traveling is interrupted. Thus, the worker can grasp at a glance the degree of accuracy of the current positional accuracy with respect to the allowable range. The display processing unit 711 may display the positional accuracy by a numerical value (for example, the ratio with respect to the allowable range) instead of the indicator Ka and the mark M1. Moreover, the display processing unit 711 may display the indicator Ka and the numerical value corresponding to the positional accuracy on the guidance screen D3.

In the indicator Ka, the display processing unit 711 may display respective ranges (for example, a range of less than the threshold value Ha1, a range between the threshold values Ha1 and Ha2, and a range of the threshold value Ha2 or more of FIG. 11A) in colors different from each other, and may perform shading display (gradation display) of each color in each range in response to the change of the positional accuracy. Moreover, on the guidance screen D3, the display processing unit 711 may display the icon K1 in a color corresponding to the position of the mark M1 indicating the current positional accuracy in the indicator Ka. Moreover, when the worker selects (presses) a specific range among a plurality of ranges of the indicator Ka on the status screen D2 (the range of less than the threshold value Ha1, the range between the threshold values Ha1 and Ha2, and the range of the threshold value Ha2 or more), the display processing unit 711 may display information of processing which is permitted or prohibited in the range. For example, when the worker selects the range of less than the threshold value Ha1, the display processing unit 711 displays the processing of setting the reference line L1 and the processing of starting autonomous traveling as permission information. When the worker selects the range between the threshold values Ha1 and Ha2, the display processing unit 711 displays the processing of continuing autonomous traveling as the permission information and displays the processing of setting the reference line L1 and the processing of starting autonomous traveling as prohibition information.

[Autonomous Traveling Processing]

Figure 13:
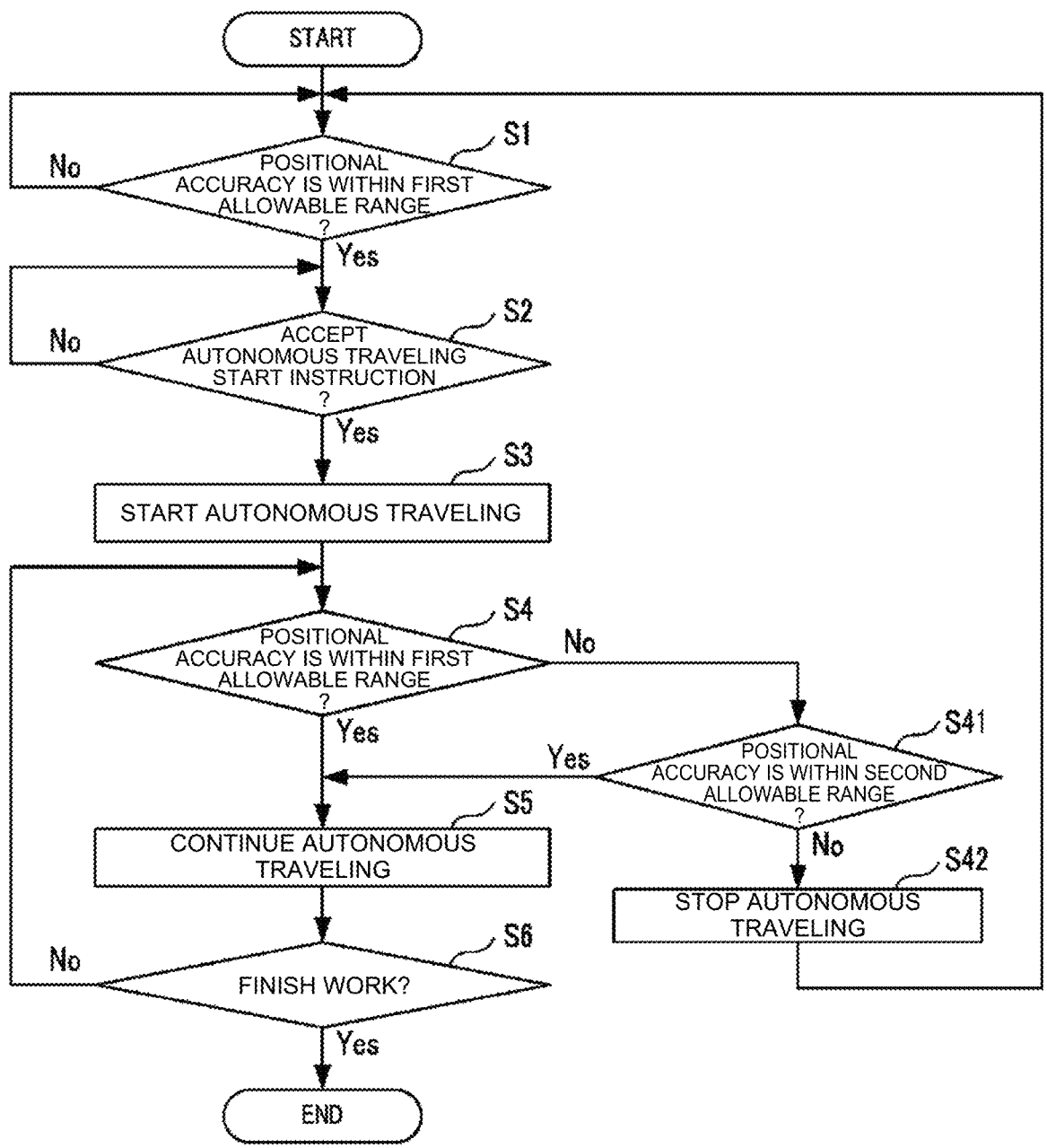
FIG. 13 is a flowchart illustrating an example of a procedure of autonomous traveling processing executed by an autonomous traveling system according to the embodiment of the present invention.

Hereinafter, an example of the autonomous traveling processing executed by the vehicle control device 11 and the operation control unit 71 will be described with reference to FIG. 13. For example, it is assumed that the type of work is set to the work A (tilling work), and the allowable ranges related to the autonomous traveling are set to Ta1 (threshold value Ha1) and Ta2 (threshold value Ha2) (refer to FIG. 11A).

The present invention may be regarded as an invention of an autonomous traveling method in which the vehicle control device 11 and the operation control unit 71 execute a part or all of the autonomous traveling processing, or as an invention of an autonomous traveling program for causing the vehicle control device 11 and the operation control unit 71 to execute a part or all of the autonomous traveling method. Moreover, one or more processors may execute the autonomous traveling processing.

In step S1, the operation control unit 71 determines whether the positional accuracy of positioning of the work machine 10 is within the first allowable range (allowable range Ta1). When the operation control unit 71 determines that the positional accuracy of positioning of the work machine 10 is within the allowable range Ta1 (S1: Yes), the processing proceeds to step S2. The operation control unit 71 waits until the positional accuracy falls within the allowable range Ta1 (until the high accuracy positioning is completed) (S1: No). The worker can confirm the positioning state on the status screen D2 by pressing the icon K1 on the menu screen D1 (refer to FIG. 5) to display the status screen D2 (refer to FIG. 6).

In step S2, the operation control unit 71 determines whether an autonomous traveling start instruction has been accepted from the worker. When the operation control unit 71 accepts the autonomous traveling start instruction from the worker (S2: Yes), the processing proceeds to step S3. The operation control unit 71 waits until accepting, from the worker, the autonomous traveling start instruction (S2: No). The operation control unit 71 accepts the autonomous traveling start instruction from the worker when the positional accuracy of positioning of the work machine 10 is within the allowable range Ta1, and rejects the autonomous traveling start instruction from the worker and prompts the worker to wait until the high accuracy positioning is completed when the positional accuracy of positioning of the work machine 10 is out of the allowable range Ta1.

In step S3, the operation control unit 71 and the vehicle control device 11 start autonomous traveling. Specifically, the operation control unit 71 outputs the autonomous traveling start instruction to the vehicle control device 11.

When acquiring the autonomous traveling start instruction, the vehicle control device 11 starts the autonomous traveling of the work machine 10 when the work machine 10 satisfies the autonomous traveling start condition (for example, being located within a predetermined distance from the target route R and within a predetermined orientation with respect to the target route R).

In step S4, the operation control unit 71 determines whether the positional accuracy of positioning of the work machine 10 is within the allowable range Ta1. When the operation control unit 71 determines that the positional accuracy of positioning of the work machine 10 is within the allowable range Ta1 (S4: Yes), the processing proceeds to step S5. When the operation control unit 71 determines that the positional accuracy is out of the allowable range Ta1 (S4: No), the processing proceeds to step S41.

In step S41, the operation control unit 71 determines whether the positional accuracy of positioning of the work machine 10 is within the second allowable range (allowable range Ta2). When the operation control unit 71 determines that the positional accuracy of positioning of the work machine 10 is within the allowable range Ta2 (S41: Yes), the processing proceeds to step S5. When the operation control unit 71 determines that the positional accuracy is out of the allowable range Ta2 (S41: No), the processing proceeds to step S42.

In Step S42, the operation control unit 71 stops the autonomous traveling of the work machine 10. Specifically, when acquiring a stop instruction from the operation control unit 71, the vehicle control device 11 stops the work machine 10 while autonomously traveling (interrupts the autonomous traveling). After step S42, the operation control unit 71 shifts the processing to step S1.

In Step S5, the operation control unit 71 and the vehicle control device 11 continue the autonomous traveling of the work machine 10. Specifically, when acquiring an instruction to continue the autonomous traveling from the operation control unit 71, the vehicle control device 11 causes the work machine 10 to continue the autonomous traveling. After step S5, the operation control unit 71 shifts the processing to step S6. As described above, after the autonomous traveling is started, the work machine 10 continues the autonomous traveling as long as the positional accuracy is within the allowable range Ta2 even if the positional accuracy decreases, and interrupts the autonomous traveling when the positional accuracy decreases to out of the allowable range Ta2. When the work machine 10 interrupts the autonomous traveling (S42), the work machine 10 waits until the positional accuracy falls within the allowable range Ta1 again (S1). When the positional accuracy falls within the allowable range Ta1, by the autonomous traveling start instruction (S2) from the worker, the work machine 10 restarts the autonomous traveling (S3).

In step S6, the operation control unit 71 determines whether the work machine 10 has finished the work. When the work machine 10 finishes the work (S6: Yes), the autonomous traveling processing is finished. In contrast, when the work machine 10 does not finish the work (S6: No), the processing returns to step S4. The operation control unit 71 and the vehicle control device 11 repeat the above-described processing until the work is finished.

As described above, the autonomous traveling system according to the present embodiment performs positioning of a position of the work machine 10 and causes the work machine 10 to execute autonomous steering (autonomous traveling of a work vehicle, autonomous flight of a flying object, or the like) on the basis of position information indicating the position of the work machine 10, for which the positioning is performed. Moreover, the autonomous traveling system permits predetermined processing related to the autonomous steering when positional accuracy of the positioning is within an allowable range.

Moreover, the autonomous traveling system sets the allowable range on the basis of a user operation or work information in the work machine 10. Specifically, the autonomous traveling system sets the allowable range on the basis of the type of work by the work machine 10 or the type of the work implement 14 connected to the work machine 10.

According to the above-described configuration, for example, the allowable range can be set depending on the type of work. Thus, for example, in work not requiring high accuracy (for example, tilling, spraying, or fertilizing), the allowable range is set to be large (the threshold value of the detection error range is set to a large value) (loosely set) (refer to FIG. 11A), so that processing related to autonomous traveling can be prevented from being restricted unnecessarily and the work efficiency can be improved.

In contrast, for example, in work requiring high accuracy (for example, ridging, seeding, or planting), the allowable range is set to be small (the threshold value of the detection error range is set to a small value) (strictly set) (refer to FIG. 11B), so that the processing related to autonomous traveling can be appropriately restricted and the work accuracy can be improved.

For example, the operation control unit 71 may set the allowable range to a large range when the worker selects a "work continuity priority" mode on a setting screen (refer to FIG. 11A), and may set the allowable range to a small range when the worker selects a "work accuracy priority" mode on the setting screen (refer to FIG. 11B).

Other Embodiments

The present invention is not limited to the above-described embodiments, and may be the following embodiments.

As another embodiment of the present invention, in the processing of generating the target route R on the basis of the reference line L1, the operation control unit 71 may set the reference line L1 on the basis of a generation history of the reference line L1 and the current positional accuracy. For example, every time the operation control unit 71 generates the reference line L1, the operation control unit 71 stores, in the storage unit 72, the generated reference line L1 and the positional accuracy at the time of generation in association with each other. When newly generating a target route R, the operation control unit 71 specifies a reference line L1 associated with positional accuracy identical or similar to the current positional accuracy with reference to the storage unit 72, and generates a new target route R using the specified reference line L1.

Moreover, the operation control unit 71 may display a list of a plurality of reference lines L1 stored in the storage unit 72 and display only a reference line L1 associated with positional accuracy identical or similar to the current positional accuracy in a selectable manner, accept a selection operation of the reference line L1 from the worker, and generate a new target route R using the reference line L1 selected by the worker.

As described above, with reference to the storage unit 72 that stores a reference line L1 generated on the basis of position information of the work machine 10 and positional accuracy when the positioning of the position information is performed in association with each other, the operation control unit 71 may specify a reference line L1 associated with the current positional accuracy, and generate a target route R of the autonomous traveling on the basis of the specified reference line L1.

Thus, when newly generating a target route R, the operation of generating a reference line L1 (the registration operation of the point A and the point B) becomes unnecessary, and the target route R can be generated using the reference line L1 corresponding to the current positional accuracy.

Every time the operation control unit 71 generates the reference line L1, the operation control unit 71 may store, in the storage unit 72, the generated reference line L1 and the type of selected work at the time of generation in association with each other. In this case, when newly generating a target route R, the operation control unit 71 specifies a reference line L1 associated with the type of work to be performed at this time with reference to the storage unit 72, and generates a new target route R using the specified reference line L1.

Figure 14:
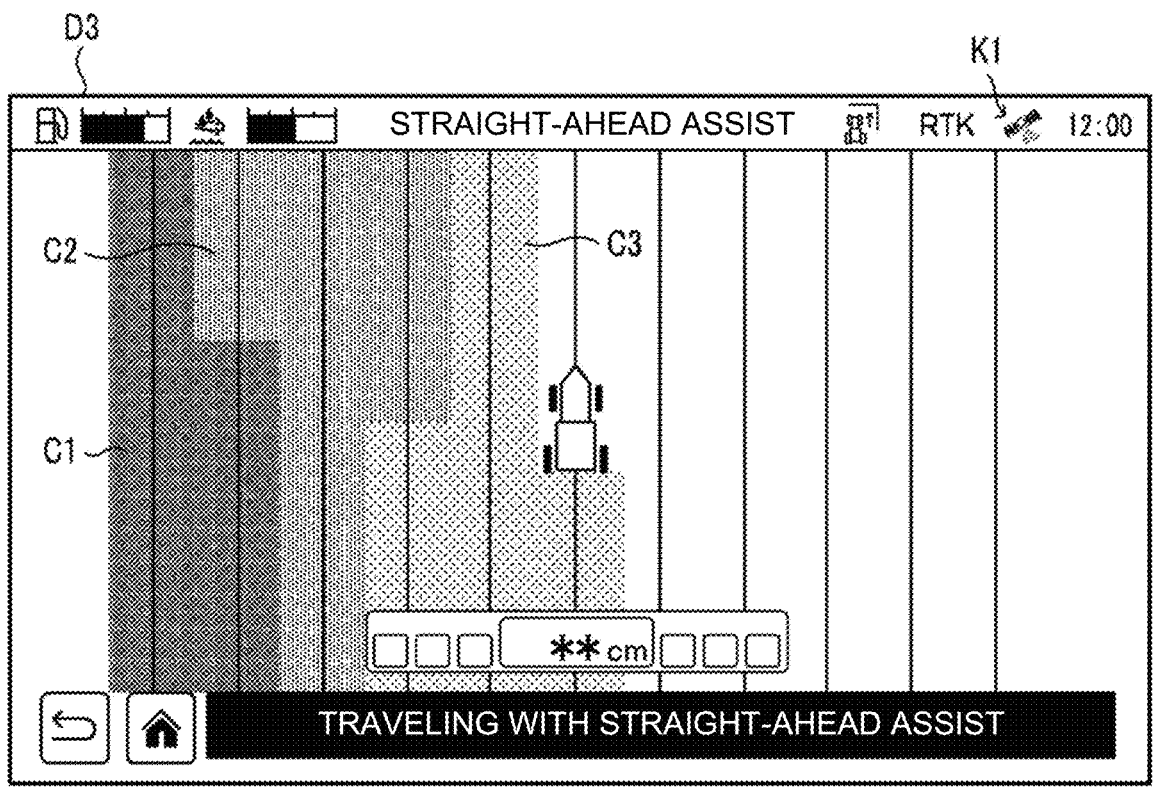
FIG. 14 is a diagram illustrating another example of the guidance screen displayed on the operation device according to the embodiment of the present invention.

As another embodiment of the present invention, the operation control unit 71 may identifiably display, on the display screen (for example, the guidance screen D3) that displays the work area, the positional accuracy during the work for each work position. For example, as illustrated in FIG. 14, the operation control unit 71 displays, on the guidance screen D3, a worked area in a display mode corresponding to the positional accuracy during the work. The example illustrated in FIG. 14 indicates that each of regions C1 to C3 has different positional accuracy. For example, the operation control unit 71 displays each of the regions C1 to C3 in a color of the indicator Ka corresponding to the positional accuracy. Thus, the worker can work while confirming the positional accuracy of the worked area.

Moreover, on the guidance screen D3 illustrated in FIG. 14, when the worker selects a region, the operation control unit 71 may display information of positional accuracy and work evaluation of the selected region. For example, when the worker selects the region C1, the operation control unit 71 displays a message indicating that the positional accuracy is low, the work state needs to be confirmed, and the like. The work evaluation may be capable of being registered by the worker. For example, the worker registers the work evaluation every time the positional accuracy changes. Moreover, the operation control unit 71 may determine and register the work evaluation on the basis of a captured image captured by a camera mounted on the work machine 10. Thus, the worker can review the work status of the entire work area after the work is finished.

Moreover, as another embodiment, the operation control unit 71 may change the allowable range on the basis of the positional accuracy and the work evaluation during the work. For example, when determining that the work accuracy is low, the operation control unit 71 changes the allowable range to a narrow range (changes the threshold value to a small value such that the detection error range becomes small) in order to improve the work accuracy by increasing the positional accuracy. In contrast, when determining that the work accuracy is higher than necessary, the operation control unit 71 changes the allowable range to a wide range (changes the threshold value to a large value such that the detection error range becomes large) in order to optimize the work accuracy by decreasing the positional accuracy. Thus, since the allowable range can be changed during the work, appropriate work accuracy can be secured.

Figure 15A:
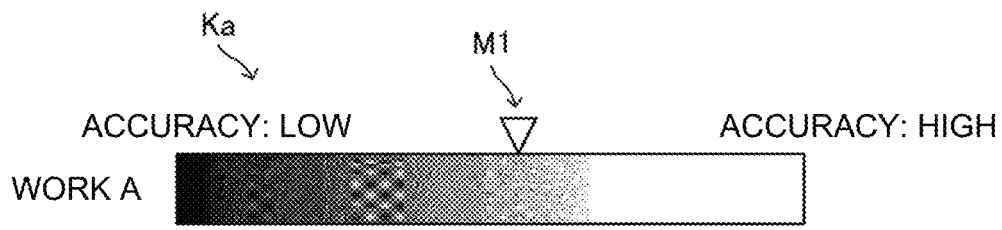
FIG. 15A is a diagram illustrating an example of the indicator according to the embodiment of the present invention.

In the above-described embodiments, on the operation screen (for example, the status screen D2), the operation control unit 71 displays the indicator Ka and identifiably displays the set allowable ranges (threshold values). However, as another embodiment, the operation control unit 71 may omit the display of the allowable ranges (threshold values). For example, as illustrated in FIG. 15A, in the indicator Ka, the operation control unit 71 performs shading display (gradation display) of a predetermined color (for example, a color associated with the work A) in response to the change of the positional accuracy and displays the mark M1 indicating the current positional accuracy. Furthermore, the operation control unit 71 displays the mark M1 in a display mode corresponding to the allowable range. For example, the operation control unit 71 displays the mark M1 in a first display mode (white color in FIG. 15A) (refer to FIG. 15A) when the allowable range is a range within Ta2 and out of Ta1 (a range between the threshold values Ha1 and Ha2) (refer to FIG. 11A), and displays the mark M1 in a second display mode (black color in FIG. 15B) (refer to FIG. 15B) when the allowable range is a range within Ta1 (a range of less than the threshold value Ha1) (refer to FIG. 11A).

Figure 15B:
FIG. 15B is a diagram illustrating an example of the indicator according to the embodiment of the present invention.
Figure 15C:
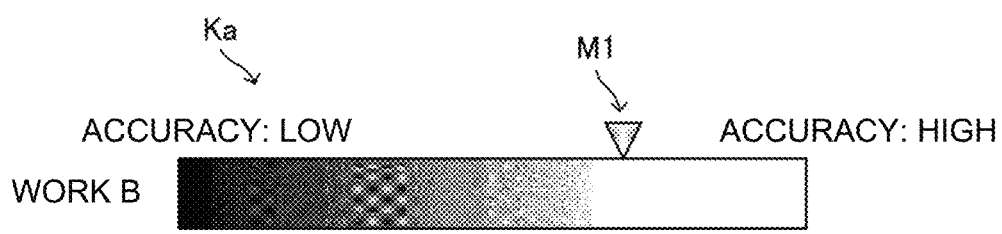
FIG. 15C is a diagram illustrating an example of the indicator according to the embodiment of the present invention.
Figure 15D:
FIG. 15D is a diagram illustrating an example of the indicator according to the embodiment of the present invention.

For example, when the type of work is the work B, as illustrated in FIG. 15B, in the indicator Ka, the operation control unit 71 performs shading display (gradation display) of a color associated with the work B in response to the change of the positional accuracy and displays the mark M1 indicating the current positional accuracy. Furthermore, for example, the operation control unit 71 displays the mark M1 in a third display mode (lightly shaded in FIG. 15C) (refer to FIG. 15C) when the allowable range is a range within Tb2 and out of Tb1 (a range between the threshold values Hb1 and Hb2) (refer to FIG. 11B), and displays the mark M1 in a fourth display mode (darkly shaded in FIG. 15D) (refer to FIG. 15D) when the allowable range is a range within Tb1 (a range of less than the threshold value Hb1) (refer to FIG. 11B).

In the configurations of FIG. 15A to FIG. 15D, in the indicator Ka, the operation control unit 71 may perform uniform display (unicolor display without gradation) of a color associated with the work and display the mark M1 indicating the current positional accuracy.

Moreover, in the configurations of FIG. 15A to FIG. 15D, in the indicator Ka, the operation control unit 71 may omit the identification display of the respective allowable ranges.

The autonomous steering system of the present invention may be configured with the operation device 17 alone or may be configured with a server including each of the processing units included in the operation device 17. Moreover, the autonomous steering system may be configured with the work machine 10 including the operation device 17.

[Supplementary Notes of Invention]

Hereinafter, a summary of the invention extracted from the embodiments will be described as supplementary notes. Each configuration and processing function described in the following supplementary notes can be selected, omitted, and combined as appropriate.

<Supplementary Note 1>

An autonomous steering method executing:

performing positioning of a position of a work machine;

causing the work machine to execute autonomous steering on the basis of position information indicating the position of the work machine, for which the positioning is performed;

permitting predetermined processing related to the autonomous steering when positional accuracy of the positioning is within an allowable range; and setting the allowable range on the basis of a user operation or work information in the work machine.

<Supplementary Note 2>

The autonomous steering method according to Supplementary Note 1, in which the allowable range is set on the basis of a type of work by the work machine or a type of a work implement connected to the work machine.

<Supplementary Note 3>

The autonomous steering method according to Supplementary Note 2, in which a first allowable range is set in a case of first work requiring first positional accuracy, and a second allowable range narrower than the first allowable range is set in a case of second work requiring positional accuracy higher than the first positional accuracy.

<Supplementary Note 4>

The autonomous steering method according to any one of Supplementary Notes 1 to 3, in which an operation of selecting a type of work by the work machine or a type of a work implement connected to the work machine, and an operation of selecting the allowable range are accepted from a user, and the allowable range selected by the user is set.

<Supplementary Note 5>

The autonomous steering method according to any one of Supplementary Notes 1 to 4, in which, with reference to a storage unit that stores a reference route generated on the basis of the position information of the work machine and the positional accuracy when the positioning of the position information is performed in association with each other, the reference route associated with current positional accuracy is specified, and a target route of the autonomous steering is generated on the basis of the specified reference route.

<Supplementary Note 6>

The autonomous steering method according to any one of Supplementary Notes 1 to 5, in which on a display screen that displays a work area, the positional accuracy during work is identifiably displayed for each work position.

<Supplementary Note 7>

The autonomous steering method according to any one of Supplementary Notes 1 to 6, in which the predetermined processing includes at least one of processing of causing the work machine to start autonomous traveling, processing of continuing autonomous traveling when the positional accuracy decreases while the work machine autonomously travels, and processing of setting a reference route for autonomous traveling.

<Supplementary Note 8>

The autonomous steering method according to any one of Supplementary Notes 1 to 7, in which, on the display screen, the current positional accuracy with respect to the allowable range is identifiably displayed.

<Supplementary Note 9>

The autonomous steering method according to Supplementary Note 8, in which, on the display screen, a reference image indicating from a lower limit to an upper limit of the positional accuracy is displayed, and the allowable range and the current positional accuracy are identifiably displayed in the reference image.

REFERENCE SIGNS LIST 10 work machine
11 vehicle control device (steering processing unit)
12 storage unit
13 traveling device
14 work implement
16 positioning device
17 operation device
71 operation control unit
72 storage unit
73 operation display unit
161 positioning control unit (positioning processing unit)
171 autonomous traveling button
172 shift button
711 display processing unit
712 acceptance processing unit
713 generation processing unit
714 setting processing unit
715 restriction processing unit
A work (first work)
B work (second work)
C1 to C3 region
D1 menu screen
D2 status screen (display screen)
D3 guidance screen (display screen)
F field
R target route
L1 reference line (reference route)
Ka indicator (reference image)
K1 icon
M1 mark
Ta1 allowable range (first allowable range)
Tb1 allowable range (second allowable range)
Ta2 allowable range (first allowable range)
Tb2 allowable range (second allowable range)
Ha1 threshold value
Ha2 threshold value
Hb1 threshold value
Hb2 threshold value

The invention claimed is:

1. An autonomous steering method executing:
    performing positioning of a position of a work machine;
    causing the work machine to execute autonomous steering on the basis of position information indicating the position of the work machine, for which the positioning is performed;
    permitting predetermined processing related to the autonomous steering when positional accuracy of the positioning is within an allowable range; and
    setting the allowable range on the basis of a user operation or work information in the work machine.

2. The autonomous steering method according to claim 1, wherein
    the allowable range is set on the basis of a type of work by the work machine or a type of a work implement connected to the work machine.

3. The autonomous steering method according to claim 2, wherein
    a first allowable range is set in a case of first work requiring first positional accuracy, and
    a second allowable range narrower than the first allowable range is set in a case of second work requiring positional accuracy higher than the first positional accuracy.

4. The autonomous steering method according to claim 1, wherein
    an operation of selecting a type of work by the work machine or a type of a work implement connected to the work machine, and an operation of selecting the allowable range are accepted from a user, and
    the allowable range selected by the user is set.

5. The autonomous steering method according to claim 1, wherein,
    with reference to a storage unit that stores a reference route generated on the basis of the position information of the work machine and the positional accuracy when the positioning of the position information is performed in association with each other, the reference route associated with current positional accuracy is specified, and a target route of the autonomous steering is generated on the basis of the specified reference route.

6. The autonomous steering method according to claim 1, wherein,
    on a display screen that displays a work area, the positional accuracy during work is identifiably displayed for each work position.

7. The autonomous steering method according to claim 1, wherein
    the predetermined processing includes at least one of processing of causing the work machine to start autonomous traveling, processing of continuing autonomous traveling when the positional accuracy decreases while the work machine autonomously travels, and processing of setting a reference route for autonomous traveling.

8. The autonomous steering method according to claim 1, wherein,
    on a display screen, the current positional accuracy with respect to the allowable range is identifiably displayed.

9. The autonomous steering method according to claim 8, wherein, on the display screen, a reference image indicating from a lower limit to an upper limit of the positional accuracy is displayed, and the allowable range and the current positional accuracy are identifiably displayed in the reference image.

10. An autonomous steering system comprising:
a positioning processing unit that performs positioning of a position of a work machine;
a steering processing unit that causes the work machine to execute autonomous steering on the basis of position information indicating the position of the work machine, for which the positioning is performed;
a restriction processing unit that permits predetermined processing related to the autonomous steering when positional accuracy of the positioning is within an allowable range; and
a setting processing unit that sets the allowable range on the basis of a user operation or work information in the work machine.

11. An autonomous steering program for causing one or more processors to execute:
performing positioning of a position of a work machine;
causing the work machine to execute autonomous steering on the basis of position information indicating the position of the work machine, for which the positioning is performed;
permitting predetermined processing related to the autonomous steering when positional accuracy of the positioning is within an allowable range; and
setting the allowable range on the basis of a user operation or work information in the work machine.

* * * * *